US010290155B2

(12) United States Patent
Dorta et al.

(10) Patent No.: US 10,290,155 B2
(45) Date of Patent: May 14, 2019

(54) 3D VIRTUAL ENVIRONMENT INTERACTION SYSTEM

(71) Applicant: Valorisation-Recherche, Limited Partnership, Montreal (CA)

(72) Inventors: Tomas Dorta, Montreal (CA); Michael Hoffman, Montreal (CA); Gokce Kinayoglu, Montreal (CA)

(73) Assignee: Valorisation-Recherche, Limited Partnership, Montreal (CA)

( * ) Notice: Subject to any disclaimer, the term of this patent is extended or adjusted under 35 U.S.C. 154(b) by 0 days.

(21) Appl. No.: 14/732,613

(22) Filed: Jun. 5, 2015

(65) Prior Publication Data
US 2015/0363980 A1     Dec. 17, 2015

Related U.S. Application Data

(60) Provisional application No. 62/013,299, filed on Jun. 17, 2014.

(51) Int. Cl.
*G06T 19/20*      (2011.01)
*G06F 1/16*       (2006.01)
(Continued)

(52) U.S. Cl.
CPC ............ *G06T 19/20* (2013.01); *G06F 1/1643* (2013.01); *G06F 1/1694* (2013.01); *G06F 3/038* (2013.01);
(Continued)

(58) Field of Classification Search
CPC ....... G06T 19/00; G06T 19/006; G06F 3/011; G06F 3/0346; G06F 3/04815; G06F 3/0488; G06F 3/04883
See application file for complete search history.

(56) References Cited

U.S. PATENT DOCUMENTS

| 5,237,647 A | 8/1993 | Roberts et al. |
| 5,396,265 A | 3/1995 | Ulrich et al. |

(Continued)

FOREIGN PATENT DOCUMENTS

WO    2008/141250 A2    11/2008

OTHER PUBLICATIONS

Kinckley et al., "Passive Real-World Interface Props for Neurosurgical Visualization", University of Virginia, 1994, p. 452-458.*

(Continued)

*Primary Examiner* — Diane M Wills
(74) *Attorney, Agent, or Firm* — Bereskin & Parr LLP/S.E.N.C.R.L., s.r.l.

(57) ABSTRACT

There is provided a 3D virtual environment interaction system comprising: a processing unit for generating a 3D virtual environment comprising a planar reference frame for allowing a user to perform a user interaction with the 3D virtual environment; a display unit for displaying the generated 3D virtual environment; a portable input device for allowing the user to control the position and orientation of the planar reference frame within the generated 3D virtual environment, the portable input device comprising a planar input surface; a position and orientation sensor for monitoring the position and orientation of the planar input surface in a real-world space, the position and orientation sensor allowing the processing unit to modify at least one of the position and the orientation of the planar reference frame in response to a change in a corresponding one of the position and orientation of the planar input surface.

30 Claims, 15 Drawing Sheets

(51) Int. Cl.
    *G06F 3/038*     (2013.01)
    *G06F 3/0481*     (2013.01)
    *G06F 3/0484*     (2013.01)
    *G06F 3/0488*     (2013.01)
    *G06F 3/0346*     (2013.01)
    *G06T 7/73*     (2017.01)

(52) U.S. Cl.
CPC ........ *G06F 3/0346* (2013.01); *G06F 3/04815* (2013.01); *G06F 3/04845* (2013.01); *G06F 3/04883* (2013.01); *G06T 7/73* (2017.01); *G06F 2203/0381* (2013.01); *G06F 2203/04808* (2013.01); *G06T 2207/30204* (2013.01); *G06T 2207/30244* (2013.01); *G06T 2219/008* (2013.01); *G06T 2219/2016* (2013.01)

(56) References Cited

U.S. PATENT DOCUMENTS

| | | | |
|---|---|---|---|
| 6,208,349 | B1 | 3/2001 | Davidson et al. |
| 6,803,928 | B2 | 10/2004 | Bimber et al. |
| 7,583,275 | B2 | 9/2009 | Neumann et al. |
| 8,232,990 | B2 | 7/2012 | King et al. |
| 8,339,364 | B2 | 12/2012 | Takeda et al. |
| 8,552,978 | B2 | 10/2013 | Ye et al. |
| 2012/0249762 | A1 | 10/2012 | Exner |
| 2013/0083055 | A1 | 4/2013 | Piemonte et al. |
| 2014/0063061 | A1 | 3/2014 | Reitan |
| 2014/0229871 | A1* | 8/2014 | Tai ..................... G06F 3/04883 715/765 |

OTHER PUBLICATIONS

Hinckley, Ken, et al. "Passive real-world interface props for neurosurgical visualization." Proceedings of the SIGCHI conference on Human factors in computing systems. ACM, 1994.*

Safin S., et al., "Analyse de référents de l'activité de co-design dans un contexte de Réalité Mixte," <http://www.hybridlab.umontreal.ca/documents/35-IHM2013.pdf>; dans Hachet M. et Roussel N. (Éds.); 25ème conférence francophone sur l'Interaction Homme-Machine; IHM, 2013, Bordeaux, France; pp. 23-32.

Dorta T., et al., "Collaboration and design education through the interconnected HIS: Immature vs. Mature CI Loops observed through Ethnography by Telepresence," <http://www.hybridlab.umontreal.ca/documents/33-ecaade2012_135.pdf>; dans Achten H., Pavlicek J., Hulin J., et Matejdan D. (Éds.) Physical Digitality, vol. 2; eCAADe, 2012; pp. 97-105; Prague, République Tchèque.

Dorta T., et al., "Elements of design conversation in the interconnected HIS," <http://www.hybridlab.umontreal.ca/documents/32-IJDSTV18N2_2011.pdf>; dans International Journal of Design Sciences and Technology; vol. 18 Number 2; pp. 65-80 (2011).

Dorta T., et al., "Conversaciones de diseño en el HIS interconectado," <http://www.hybridlab.umontreal.ca/documents/31-sigradi.pdf>; dans Chiarella, M., Tosello, M. E. (Éds.); Cultura Aumentada, SIGraDi, 2011; pp. 494-498; Santa Fe, Argentina.

Dorta T., et al., "Comparing immersion in collaborative ideation through design conversations, workload and experience," <http://www.hybridlab.umontreal.ca/documents/30-ACADIA.pdf>; dans Taron, J., Parlac, V., Kolarevic, B. Johnson, J. (Éds.); Integration Through Computation; ACADIA, 2011; pp. 216-225; Banff, Canada.

Dorta T., et al., "Comparing immersion in remote and local collaborative ideation through sketches: a case study," <http://www.hybridlab.umontreal.ca/documents/29-CAADfutures.pdf>, dans Leclercq, P., Heylighen, A. and Martin, G. (eds.); CAADFutures 2011: Designing Together; ULg, 2011; pp. 25-39; Liége, Belgium.

Dorta T., et al., "Design conversations in the interconnected HIS," dans G. Carrara, A. Fioravanti, A. Trento (eds.); Connecting Brains Shaping the World: Collaborative Design Spaces; EuropIA 13, 2011; pp. 83-94; Rome.

Dorta T., et al., "First steps of the Augmented Design Studio: The interconnected Hybrid Ideation Space and the CI Loop," <http://www.hybridlab.umontreal.ca/documents/27-caadria2011.pdf>; dans C. M. Herr, N. Gu, S. Roudavsky, M. A. Schnabel (eds.); Circuit Bending, Breaking and Mending: Pro-ceedings of the 16th International Conference on Computer-Aided Architectural Design Research in Asia CAADRIA 2011; Apr. 2011; pp. 271-280; Newcastle, Australia.

Lesage A., et al., "Beyond the functional / pleasurable split : User Experience with Conceptual Design Tools," <http://www.hybridlab.umontreal.ca/documents/26-caadria2011.pdf>; dans C. M. Herr, N. Gu, S. Roudavsky, M. A. Schnabel (eds.); Circuit Bending, Breaking and Mending: Pro-ceedings of the 16th International Conference on Computer-Aided Architectural Design Research in Asia CAADRIA 2011; Apr. 2011, pp. 291-300; Newcastle, Australia.

Pérez E. et al, "Assessment of Design Tools for Ideation," <http://www.hybridlab.umontreal.ca/documents/25-caadria2011.pdf>; dans C. M. Herr, N. Gu, S. Roudavsky, M. A. Schnabel (eds.); Circuit Bending, Breaking and Mending: Pro-ceedings of the 16th International Conference on Computer-Aided Architectural Design Research in Asia CAADRIA 2011; Apr. 2011, pp. 429-438; Newcastle, Australia.

Dorta T., et al., "Signs of Collaborative Ideation and the Hybrid Ideation Space," <http://www.hybridlab.umontreal.ca/documents/24-ICDC2010.pdf>; dans Design Creativity 2010; Taura, T. et Nagai, Y. (Éds.) ICDC2010; Springer, 2010; pp. 199-206; Kobe, Japan.

Dorta, T., et al., "Design tools and collaborative ideation," <http://www.hybridlab.umontreal.ca/documents/23-CAADFutures.pdf>; dans Joining languages, cultures and vision; CAADFutures 2009; Tidafi, T. et Dorta, T. (Eds.); PUM, Montréal, Canada (2009).

Dorta, T., "Design Flow and Ideation; in International Journal of Architectural Computing"; vol. 06 No. 03; pp. 299-316 (2008).

Dorta, T., et al., "Point and Sketch: Collaboration in the Hybrid Ideation Space," in ACM Interaction humain machine: 20 ans d'interaction homme-machine francophone: De l'interaction à la fusion entre l'humain et la technologie; Bastien, C. et Carbonell, N. (Eds.) IHM 2008; Sep. 2008, pp. 129-136; Metz, France.

Dorta, T., et al., "The Ideation Gap: Hybrid tools, Design flow and Practice," <http://www.hybridlab.umontreal.ca/documents/19-design-studies.pdf>; in Design Studies; vol. 29, No. 2; pp. 121-141 (2008).

Dorta, T., "Implementing and Assessing the Hybrid Ideation Space: a Cognitive Artifact for Conceptual Design," in International Journal of Design Sciences and Technology; vol. 14 No. 2, pp. 119-133 (2007).

Dorta, T., "Ideation and Design Flow through the Hybrid Ideation Space," in Communication in the Visual Society; SIGRADI 2007; Oct. 2007; pp. 418-422; Mexico.

Dorta, T., "Augmented Sketches and Models: The Hybrid Ideation Space as a Cognitive Artifact for Conceptual Design," in Digital Thinking in Architecture, Civil Engineering, Archaeology, Urban Planning and Design: Finding the Ways; De Paoli, G., Zreik, K. et Beheshti, R. (Eds.); EuropIA 11; Sep. 2007; pp. 251-64; Montreal, Canada.

Dorta, T., "Virtualidad y creación? El vacío del ordenador en el diseño conceptual," in Temes de Disseny, Elisava; vol. 23, pp. 163-173; Barcelona; Spanish <http://www.hybridlab.umontreal.ca/documents/14-TdD23_CAST_Dorta.pdf>, English, http://www.hybridlab.umontreal.ca/documents/14-TdD23_ANG_Dorta.pdf> and Catalán <http://www.hybridlab.umontreal.ca/documents/14-TdD23_CAT_Dorta.pdf (2006).

Dorta, T., et al., "Immersive Drafted Virtual Reality: a new approach for ideation within virtual reality," <http://www.hybridlab.umontreal.ca/documents/13-ACADIA2006a.pdf>; in Synthetic Landscapes; Luhan, G.; Anzalone, P.; Cabrinha, M. and Clarke, C. (Eds.); ACADIA 2006; Oct. 2006, pp. 304-316; Louisville, Kentucky.

Nicholas Katzakis et al., "Plane-Casting : 3D Cursor Control with a SmartIphone," APCHI'13; Sep. 24-27, 2013; pp. 199-200, Bangalori, India.

Michael Tsang et al., "Boom Chameleon: Simultaneous capture of 3D viewpoint voice and gesture annotations on a spatially-aware display," UIST'02; Oct. 27-30, 2002, pp. 111-120, Paris, France.

(56) References Cited

OTHER PUBLICATIONS

Hrvoje Benko et al., "Multi-Point Interactions with Immersive Omnidirectional Visualizations in a Dome," ITS'10; Nov. 7-10, 2010; pp. 19-28, Saarbr?cken, Germany.

Steffen Gauglitz et al., "World-Stabilized Annotations and Virtual Scene Navigation for Remote Collaboration," UIST 2014; Oct. 5-8, 2014 (6 pages), Honolulu, HI.

Hongxin Zhang et al., "Using the CAT for 3D Sketching in front of Large Displays," International Symposium on Smart Graphics, Aug. 2008 (7 pages), Rennes, France.

Mark R. Mine et al., "Moving Objects in Space: Exploiting Proprioception in Virtual-Environment Interaction," ACM Press/Addison-Wesley Publishing Co. New York, 1997.

Mark Mine et al., "Making VR Work: Building a Real-World Immersive Modeling Application in the Virtual World," SUI'14; Oct. 4-5, 2014, pp. 80-89; Honolulu, HI, U.S.A.

Daniel Medeiros et al., "A Tabler-Based 3D Interaction Tool for Virtual Engineering Environments," VRCAI 2013, Nov. 17-19, 2013, pp. 211-218, Hong Kong.

Ivan Poupyrev et al., "Virtual Notepad : Handwriting in Immersive VR," Proceedings of VRAIS'98, Mar. 1998, (7 pages), Atlanta, Georgia.

Hinckley, Ken et al., "Two-Handed Virtual Manipulation," ACM Transactions on Computer-Human Interaction, vol. 5, No. 3, Sep. 3, 1998, pp. 260-302, U.S.A.

Emmanuel Sachs et al., "3-Draw: A Tool for Designing 3D Shapes," IEEE Computer Graphics & Applications, Nov. 1991, pp. 18-25, U.S.A.

Liverani, Alfredo et al., "Tablet-based 3D Sketching and Curve Reverse Modelling," Int. Computer Aided engineering and Technology, downloaded from <http://www.diem.ing.unibo.it/personale/liverani/papers/07%20LIVERANI.pdf>, 2013.

Fiorentino, et al., "Spacedesign: A Mixed Reality Workspace for Aesthetic Industrial Design," University Darmstadt, Sep. 26, 2011, <https://www.youtube.com/watch?v=GOMx_sytCmU>.

Williams, George et al., "Physical Presence—Palettes in Virtual Spaces," Fakespace Inc., Research and Development Group, 1999.

Zsolt Szalavari et al., "Using the Personal Interaction Panel for 3D Interaction," Institute of Computer Graphics, Vienna University of Technology, Karlsplatz 13/186/2, A-1040, <http://www.cg.tuwien.ac.at>, 1997.

Rasmuson, Joakim, et al., "Flying Colors: Freehand 3D Drawing in a Collaborative Virtual Environment on Mobile Devices," <www.theunwiredpeople.com_wp-content_uploads_sites_8_2014_04_sider14_submission_42>, 2014.

Flaherty, Joseph, "Oculus Rift Hack Lets you Draw in 3D," Wired.com, Apr. 3, 2014, <http://www.wired.com/2014/04/design_04022014_rift/ Apr. 3, 2014>.

Drawing and painting in VR by using a graphics tablet as virtual paper (self.oculus), Reddit comment thread, accessed Jun. 30, 2014, <http://www.reddit.com/r/oculus/comments/1wsdlv/drawing_and_painting_in_vr_by_using_a_graphics>.

* cited by examiner

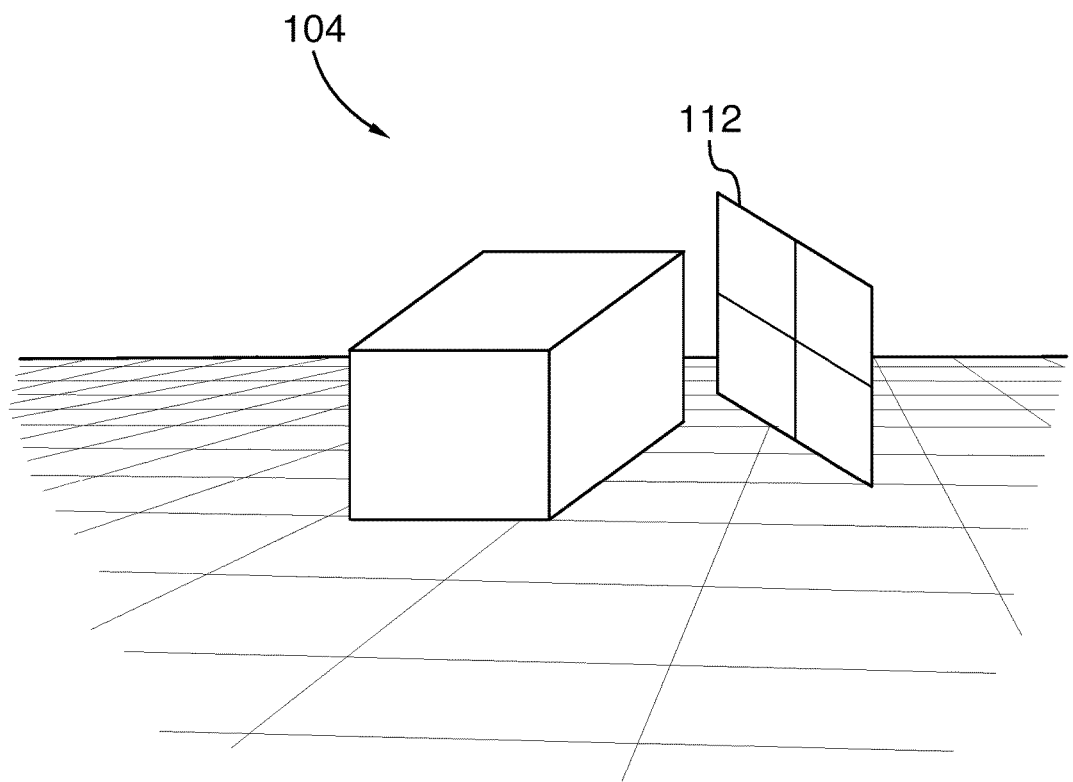
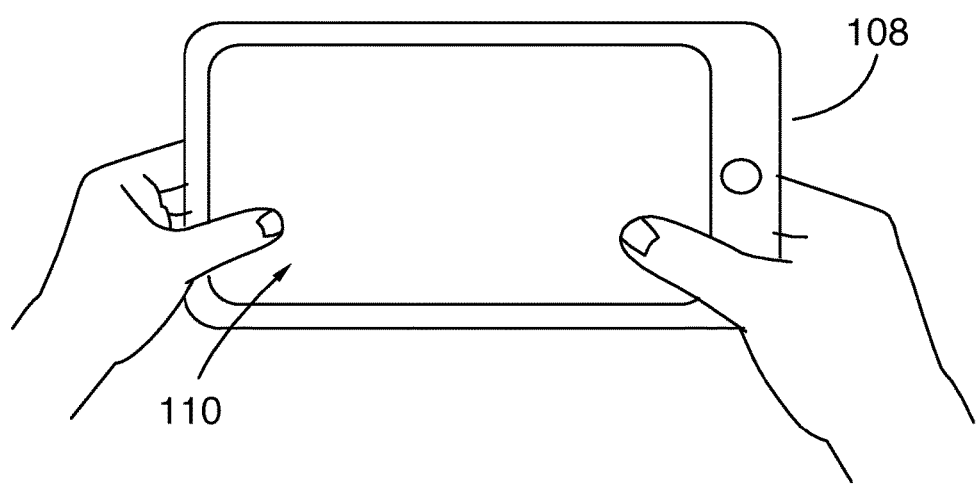
FIG.2

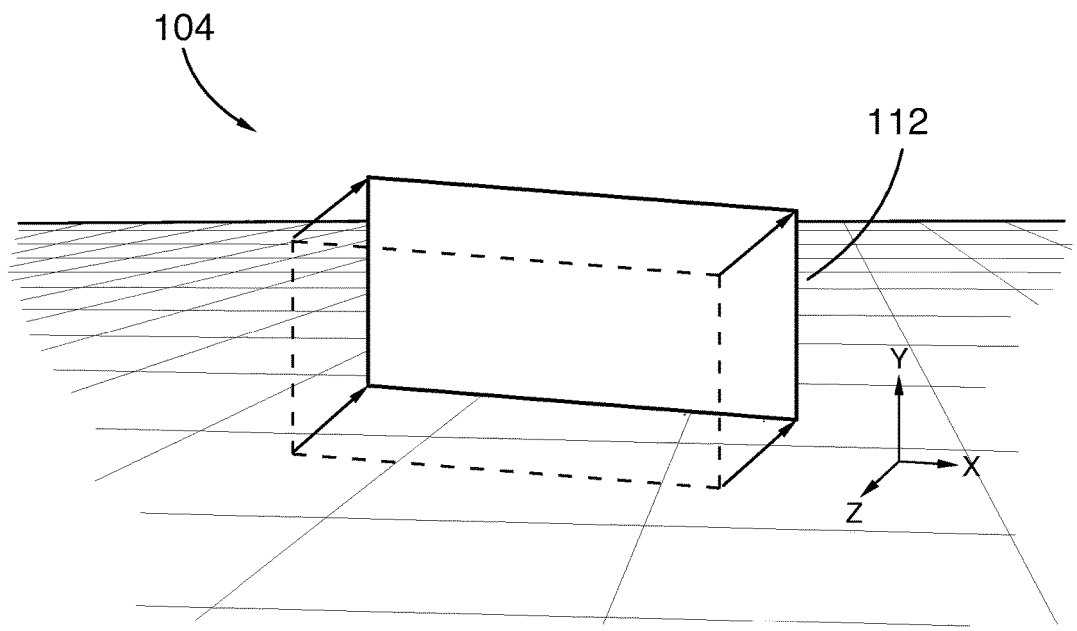
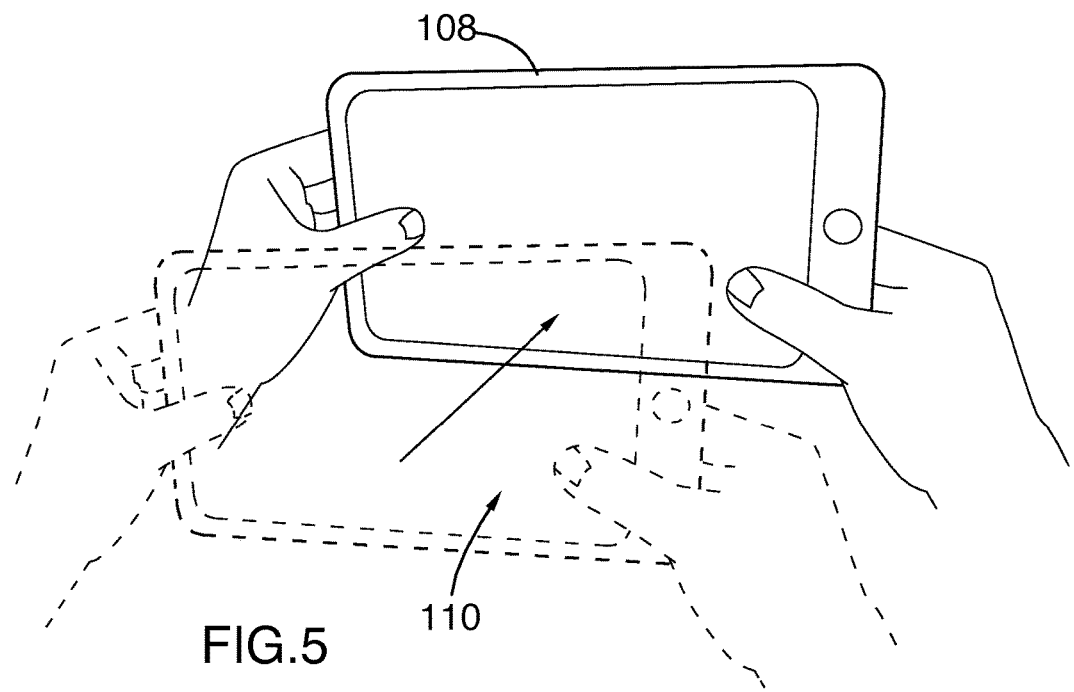
FIG.5

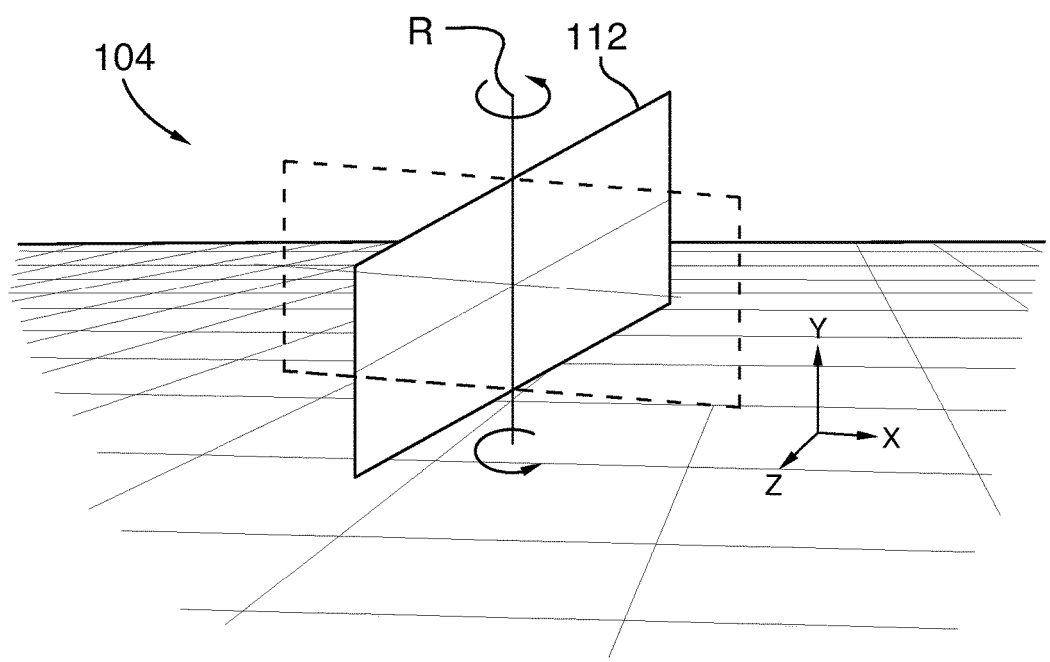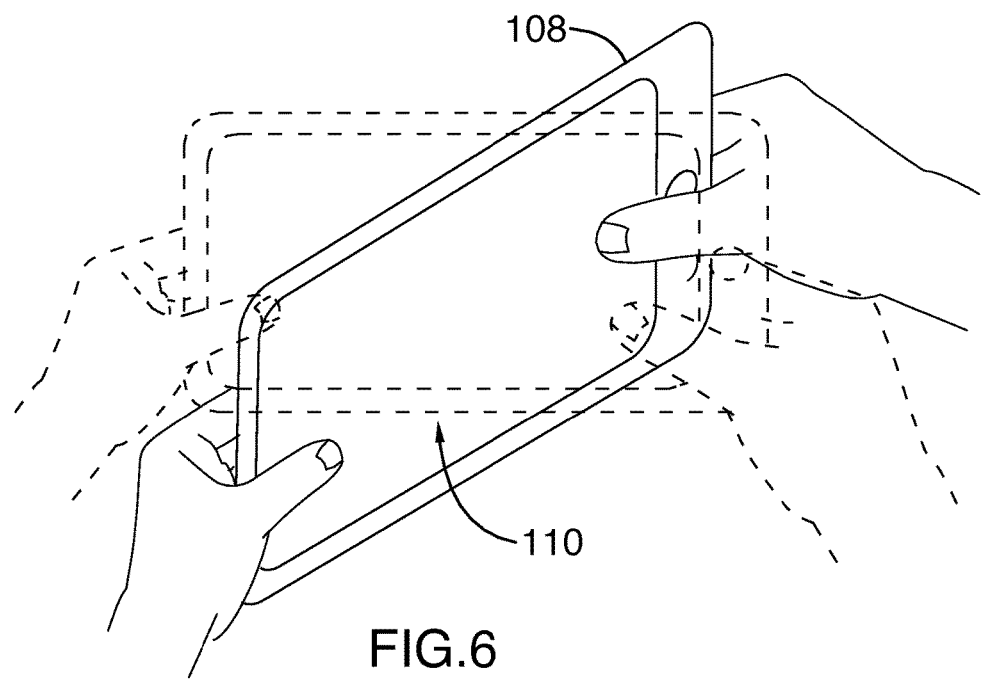
FIG.6

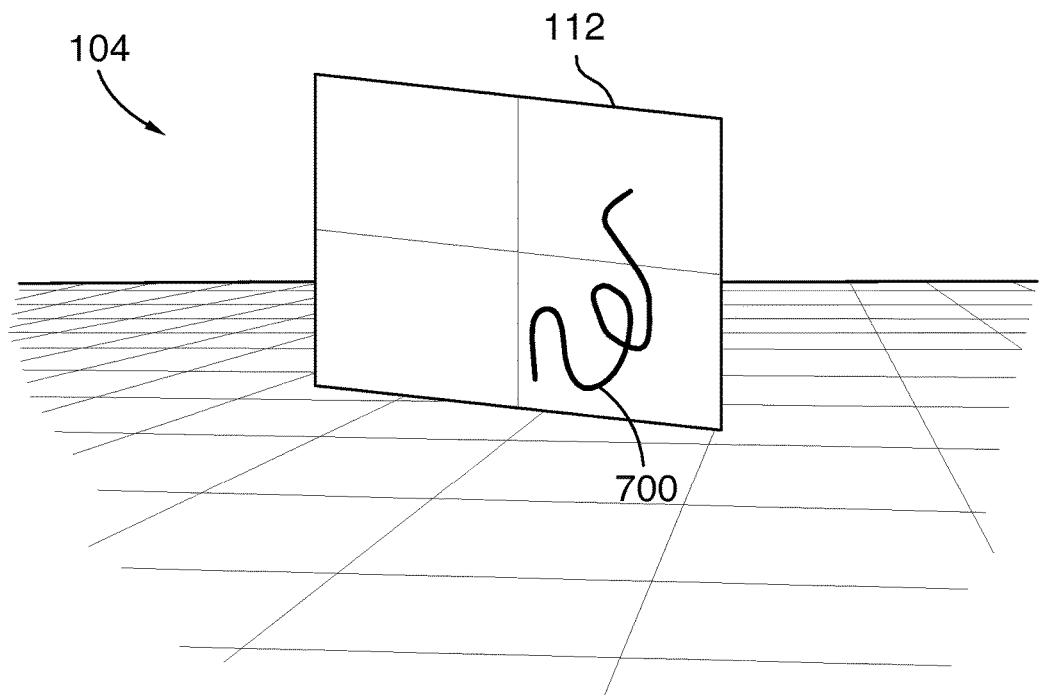
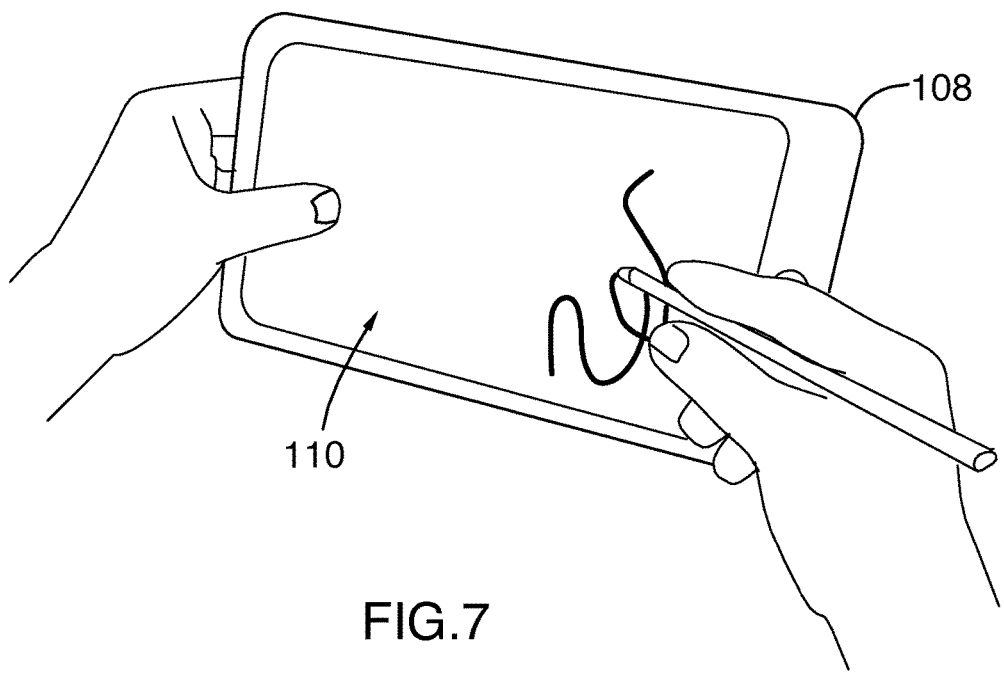
FIG.7

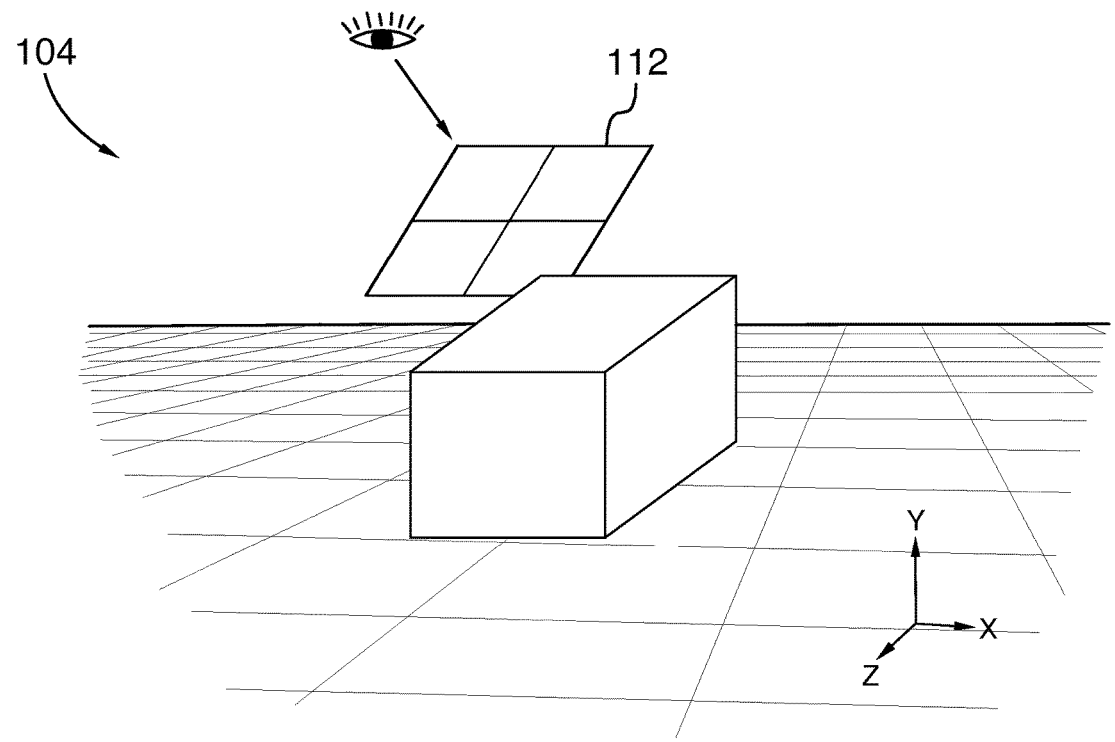
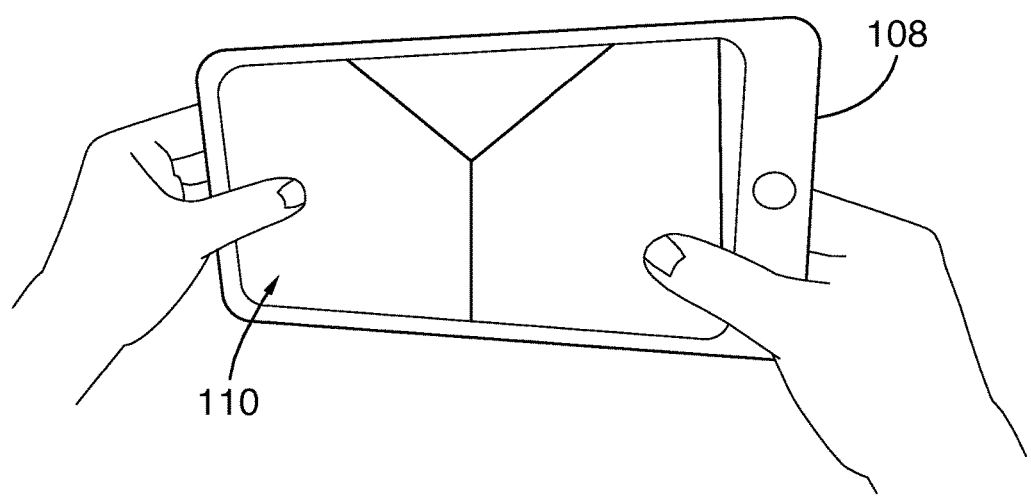
FIG.13

3D VIRTUAL ENVIRONMENT INTERACTION SYSTEM

CROSS-REFERENCE TO RELATED APPLICATIONS

This application claims priority 35 U.S.C. § 119 of U.S. Provisional Patent Application No. 62/013,299, filed on Jun. 17, 2014, the specification of which is incorporated herein by reference.

TECHNICAL FIELD

The invention relates to 3D virtual environment, and more specifically to interaction systems and methods for 3D virtual environments.

BACKGROUND

Three-dimensional (3D or 3d) virtual environments are used in a variety of applications. They have become a mainstay in computer-aided design (CAD) by reducing or even eliminating the need to produce costly prototypes when designing a new object, part or machine. 3D virtual environments can also be used to visualize existing objects and environments, for example in immersive displays or flight simulators, or to create new environments such as those found in video games or animated movies.

To create new content for a 3D virtual environment, edit existing content of the environment or simply to navigate through the environment, it is necessary for the user to perform interactions (i.e. to interact) with the environment. User interaction in these 3D virtual environments can be achieved in a variety of ways. A first method consists in inputting commands to a program generating the 3D virtual environment through a keyboard. The program will usually have a preprogrammed set of instructions to which it will respond. The user may input a particular command corresponding to a certain interaction and may also input a particular set of coordinates corresponding to the location where the interaction is to take place. The interaction could comprise drawing lines, vertices, solid objects, etc. within the 3D environment, or selecting one or more objects within the 3D environment to set or change properties of said object or to change its state within the 3D environment.

Unfortunately, this method is fastidious and time-consuming, and requires from the user a precise knowledge of the location where the interaction will be performed.

This method has been largely superseded by the use of a pointer or cursor which allows the user to indicate where in the 3D virtual environment a certain interaction is to take place. The cursor is typically controlled by a computer mouse which is moved on a planar surface. Unfortunately, this configuration only allows the cursor to be moved in a static two-dimensional workplane which is generally coplanar with the screen of a display unit. To select an object or a surface, the user must bring said object or surface within the workplane, which may involve manipulations within the 3D environment such as hiding other objects, modifying the point of view, etc., all of which are relatively complex and time-consuming.

There is therefore a need for a new system which would enable simple and efficient interactions within a 3D virtual environment.

BRIEF SUMMARY

According to one aspect, there is provided a 3D virtual environment interaction system comprising: a processing unit for generating a 3D virtual environment, the 3D virtual environment comprising a planar reference frame for allowing a user to perform a user interaction with the 3D virtual environment; a display unit operatively connected to the processing unit for displaying the generated 3D virtual environment; a portable input device for allowing the user to control the position and orientation of the planar reference frame within the generated 3D virtual environment, the portable input device comprising a planar input surface; a position and orientation sensor for monitoring the position and orientation of the planar input surface in a real-world space, the position and orientation sensor being operatively connected to the processing unit to allow the processing unit to modify at least one of the position and the orientation of the planar reference frame in response to a change in a corresponding one of the position and orientation of the planar input surface.

In one embodiment, the user interaction comprises inserting a two-dimensional drawing on the planar reference frame.

In one embodiment, the planar input surface is adapted to allow the user to draw the two-dimensional drawing thereon.

In one embodiment, the portable input device comprises at least one virtual drawing tool selected from a group consisting of: a line drawing tool and a two-dimensional shape drawing tool.

In one embodiment, the processing unit is adapted to produce a three-dimensional drawing when the portable device is moved in the real-world space in a direction normal to the planar input surface, thereby moving the planar reference frame with the inserted two-dimensional drawing.

In one embodiment, the user interaction comprises selecting a virtual object in the 3D virtual environment.

In one embodiment, selecting the virtual object comprises positioning the planar reference frame such that the planar reference frame intersects the virtual object.

In one embodiment, the user interaction further comprises scaling the selected virtual object.

In one embodiment, the scaling comprises isotropic scaling.

In one embodiment, the scaling comprises anisotropic scaling.

In one embodiment, the user interaction further comprises moving the selected object.

In one embodiment, moving the selected object comprises at least one of moving the selected object in translation and rotating the selected object.

In one embodiment, the user interaction further comprises duplicating the selected object.

In one embodiment, the user interaction comprises importing an existing virtual object into the 3D virtual environment, and positioning and orienting said existing virtual object within the 3D virtual environment according to the position and orientation of the planar reference frame.

In one embodiment, the processing unit is adapted to move the planar reference frame according to a selected one of at least one frame movement mode in response to a movement of the planar input surface.

In one embodiment, the at least one frame movement mode comprises a free movement mode in which the planar reference frame is moved such that the position and orientation of the planar reference frame within the 3D virtual environment corresponds to the position and orientation of the planar input surface in the real-world space.

In one embodiment, the at least one frame movement mode comprises a planar movement mode in which movement of the planar reference frame is restricted to translation in a direction tangential relative to the planar reference frame.

In one embodiment, the at least one frame movement mode comprises a normal movement mode in which movement of the planar reference frame is restricted to translation along a linear movement path extending in direction normal to the planar reference frame.

In one embodiment, the at least one frame movement mode comprises a hinged movement mode in which movement of the planar reference frame is restricted to rotation about a rotation axis extending in a direction tangential relative to the planar reference frame.

In one embodiment, the at least one frame movement mode comprises an angle snapping mode in which the planar reference frame is adapted to move to one of a plurality of predetermined orientations when the orientation of the planar reference frame is within a predetermined angular range from said one of the plurality of predetermined orientations.

In one embodiment, the predetermined angular range comprises a 5-degree range.

In one embodiment, the planar input surface is further adapted to receive at least one touch gesture and wherein the processing unit is adapted to modify at least one of the position and orientation of the planar reference frame in response to said at least one touch gesture.

In one embodiment, the touch gesture comprises a multi-touch gesture.

In one embodiment, the portable input device further comprises a secondary display for displaying the 3D virtual environment.

In one embodiment, the secondary display is adapted to display an orthogonal projection of the 3D virtual environment as projected on the planar reference frame.

In one embodiment, the display unit is adapted to display the 3D virtual environment in a perspective view from a main point of view and the secondary display is adapted to display the 3D virtual environment in a perspective view from a secondary point of view which is different from the main point of view.

In one embodiment, the planar input surface comprises a touchscreen, the touchscreen further defining the secondary display.

In one embodiment, the display unit is adapted to display the 3D virtual environment from a main point of view, and further wherein the processing unit is adapted for allowing the user to modify at least one of the position and orientation of the main point of view.

In one embodiment, the position of the main point of view is movable by sliding a finger on the planar input surface.

In one embodiment, the planar input surface is adapted to receive a rotation gesture, the processing unit being adapted to change the orientation of the main point of view according to said rotation gesture.

DESCRIPTION OF THE DRAWINGS

FIG. 2 is a portable input device and of a 3D virtual environment for the 3D virtual environment interaction system shown in FIG. 1;

FIG. 5 is a schematic view of a portable input device and of a 3D virtual environment for the 3D virtual environment interaction system shown in FIG. 1, showing movement of the planar reference frame in a normal movement mode;

FIG. 6 is a schematic view of a portable input device and of a 3D virtual environment for the 3D virtual environment interaction system shown in FIG. 1, showing movement of the planar reference frame in a hinged movement mode;

FIG. 7 is a schematic view of a portable input device and of a 3D virtual environment for the 3D virtual environment interaction system shown in FIG. 1, showing a two-dimensional drawing being inserted in the planar reference frame;

FIG. 13 is a schematic view of a portable input device and of a 3D virtual environment for the 3D virtual environment interaction system shown in FIG. 1, showing an orthogonal projection of the 3D virtual environment in the secondary display.

DETAILED DESCRIPTION

Figure 1:
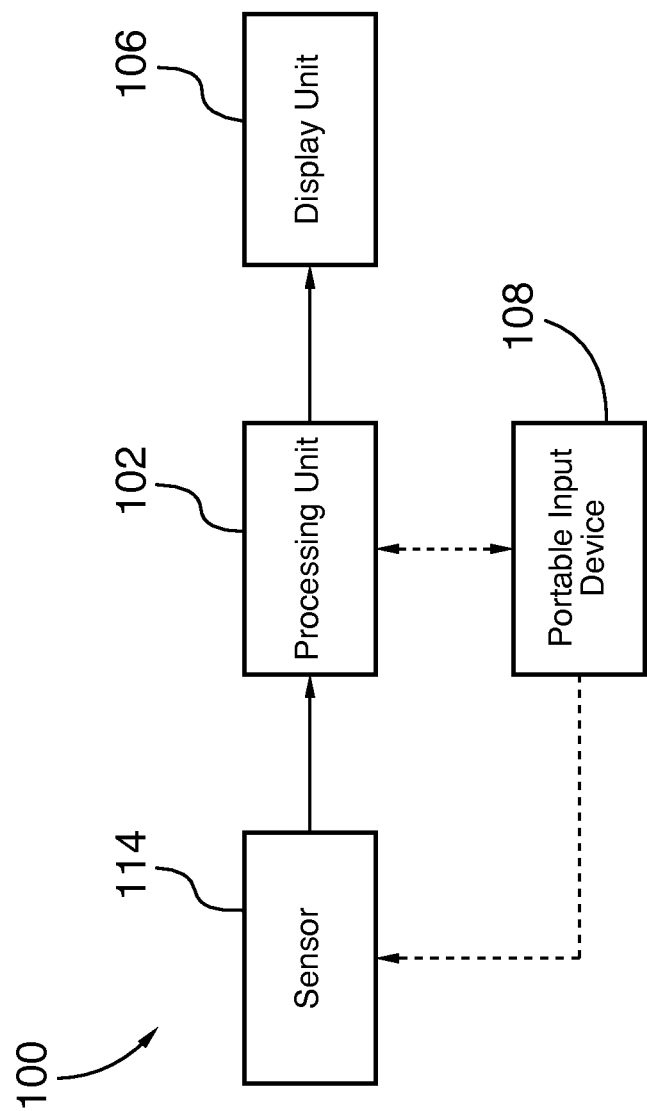
FIG. 1 is a block diagram showing a 3D virtual environment interaction system, in accordance with one embodiment.

FIGS. 1 and 2 show a tridimensional (3D) virtual environment interaction system 100, in accordance with one embodiment. In this embodiment, the 3D virtual environment interaction system 100 comprises a processing unit 102 for generating a 3D virtual environment 104 and a display unit 106 operatively connected to the processing unit 102 for displaying the generated 3D virtual environment 104.

In one embodiment, the processing unit 102 comprises a personal computer which includes a dedicated 3D modeling program which is adapted to generate the 3D virtual environment 104.

Alternatively, the processing unit 102 may include a personal computer which includes an existing 3D modeling program which is adapted to generate the 3D virtual environment 104. In this embodiment, the existing 3D modeling program may include a dedicated module which could be installed within the existing 3D modeling program in order to enable the existing 3D modeling program to be used with the system 100 described herein. This may render the system 100 more accessible by eliminating the need for the user to acquire an entirely new 3D modeling program.

The system 100 further comprises a portable input device 108 which allows a user to interact with the 3D virtual environment 104. Specifically, the portable input device 108 comprises a planar input surface 110 and the 3D virtual environment 104 comprises a planar reference frame 112 associated with the planar input surface 110. The planar reference frame 112 acts as a "3D cursor" to allow the user to perform user interactions with the 3D virtual environment 104, and the position and orientation of the planar reference frame 112 within the 3D virtual environment 104 is controlled by the portable input device 108.

To enable this control, the 3D virtual environment interaction system 100 further comprises a sensor 114 operatively connected to the processing unit 102 for monitoring the orientation and position of the planar input surface 110. This allows the processing unit 102 to modify at least one of the position and the orientation of the planar reference frame 112, and thereby move the planar reference frame 112 within the 3D virtual environment 104, in response to a change in a corresponding one of the position and orientation of the planar input surface 110.

In the embodiments illustrated in FIGS. 2 to 14, the planar reference frame 112 is rectangular, and the planar input surface 110 is also rectangular. Alternatively, both the planar reference frame 112 and the planar input surface 110 could have any other planar shape that a skilled addressee may deem fit for the intended use of the system 100.

In one embodiment, the portable input device 108 comprises a tablet computer having a touchscreen which defines the planar input surface 110. The use of a touchscreen can allow the user to readily have access to a plurality of functions from the portable input device 108, as will become apparent below. Alternatively, the portable input device 108 could comprise a smartwatch, a smartphone or any other portable input device known to a skilled addressee.

In one embodiment, the portable input device 108 is wirelessly connected to the processing unit 102. This allows a relatively large of motion for the user to move the portable input device 108 into the real-world space. Alternatively, the portable input device 108 could be connected to the processing unit 102 via a wired connection.

In one embodiment, the sensor 114 comprises a magnetic sensor. Specifically, the magnetic sensor comprises a receiver and an emitter. One of the receiver and the emitter is attached to the portable input device 108 and the other one of the receiver and the emitter is positioned at a static position. The magnetic sensor can thereby monitor movement of the emitter relative to the receiver, which can then be converted by the processing unit 102 to movement of the planar reference frame 112 in the 3D virtual environment.

In one embodiment, the magnetic sensor is adapted to monitor both the position and the orientation of the portable input device 108. Alternatively, the magnetic sensor could be adapted to monitor only the position of the portable input device 108.

In one embodiment, the portable input device 108 comprises an orientation sensor mounted on the portable input device 108. Specifically, the orientation sensor can comprise at least one of a gyroscope and an accelerometer. Orientation of the portable input device 108 could therefore be monitored by the portable input device 108 itself.

In one embodiment, the sensor 114 comprises an optical sensor. Specifically, the optical sensor could comprise one or more optical markers attached to the portable input device 108 and at least one camera operatively connected to the processing unit 102 for monitoring the position and orientation of the portable input device 108 based on the position of the markers in the real-world space.

In one embodiment, the sensor 114 could comprise a plurality of emitters and receivers disposed to permit the monitoring of the position of the portable input device 108 by triangulation. Specifically, the portable input device 108 could be adapted to receive and emit a signal (using a Bluetooth protocol for example) and the position and orientation of the portable input device 108 would be determined using signals from other emitters disposed at known locations in the real-world space.

In one embodiment, the sensor 114 comprises a camera mounted to or embedded in the portable input device 108. The camera could be adapted to determine the position and orientation of the portable input device 108 based on a detection of one or more markers disposed at fixed locations in the real-world space.

It will be appreciated that the sensor 114 is not limited to the sensors described hereinabove, and that the sensor 114 could instead comprise one or more of various position and orientation sensors known to a skilled addressee.

In one embodiment, the display unit 106 comprises a display monitor, such as a computer monitor or a television monitor. Alternatively, the display monitor 106 could comprise a projector and a screen on which the 3D virtual environment is displayed.

In one embodiment, the display unit 106 provides an immersive display. Specifically, the display unit 106 could comprise a projector, a spherical mirror and a concave, spherical screen which allows the user to stand at or near its center. Alternatively, the display unit 106 could instead comprise a head-mounted display, or any other types of display known to a skilled addressee.

Now referring to FIGS. 3 to 7, the processing unit 102 may be adapted to move the planar reference frame 112 according to a desired frame movement mode which is selected by the user from one of a plurality of available frame movement modes. The selection could be made directly by the user on the planar input surface 110.

Figure 3:
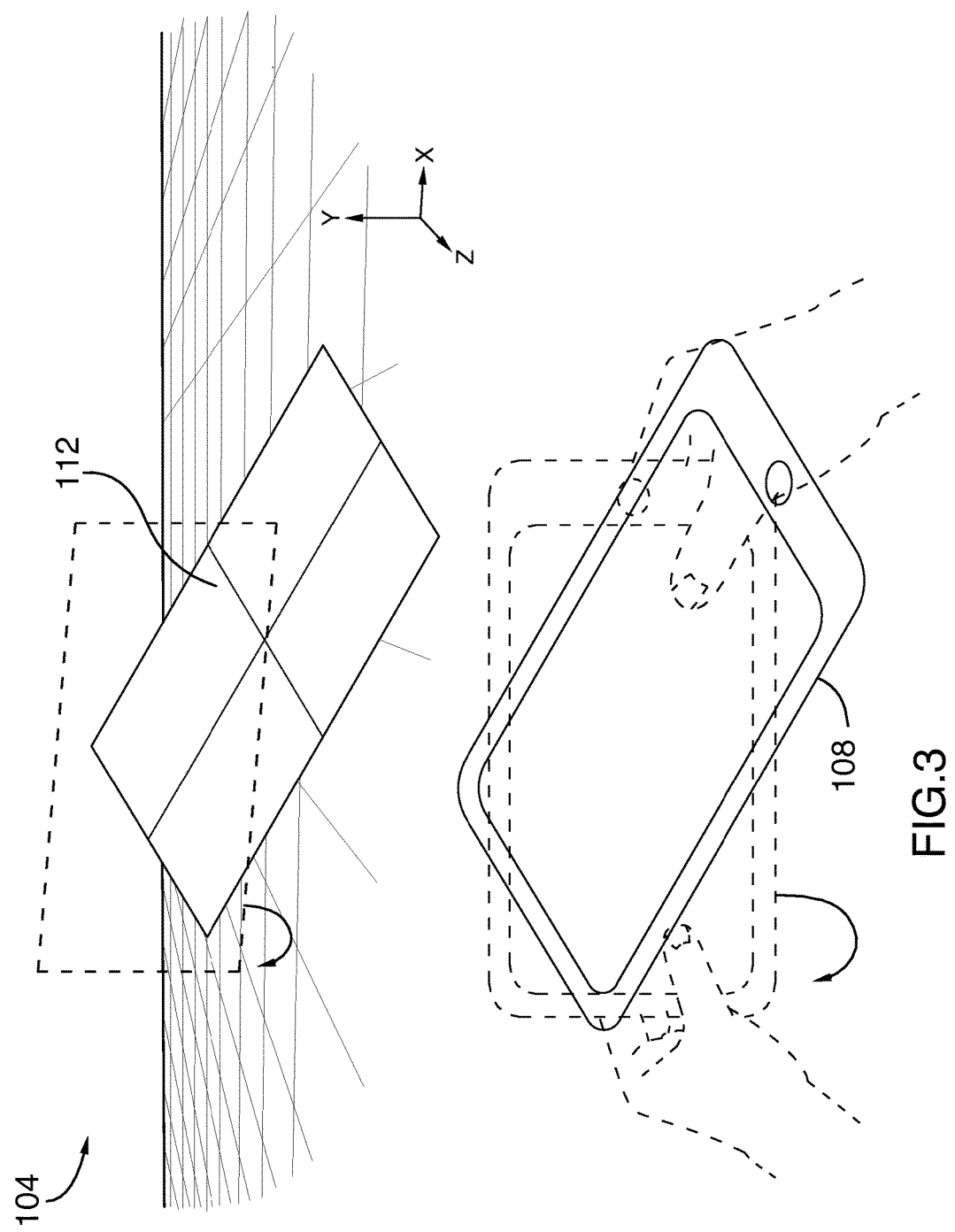
FIG. 3 is a schematic view of a portable input device and of a 3D virtual environment for the 3D virtual environment interaction system shown in FIG. 1, showing movement of a planar reference frame in a free movement mode.

In one embodiment illustrated in FIG. 3, the plurality of frame movement modes includes a free movement mode which allows the user to freely move the planar reference frame 112 in the 3D virtual environment 104 by moving the portable input device 108 in the real-world. In this case, movement of the position and orientation of the planar reference frame 112 directly corresponds to movement of the position and orientation of the planar input surface 110 of the portable input device 108. Specifically, the orientation of the planar reference frame 112 could correspond to the actual orientation of the planar input surface 110 in the real-world space. The position of the planar reference frame 112 could be computed using the sensed position of the planar input surface 110.

The plurality of frame movement modes could further include a plurality of movement restriction modes which can allow the user to better and more easily position the planar reference frame 112 within the 3D virtual environment 104.

Figure 4:
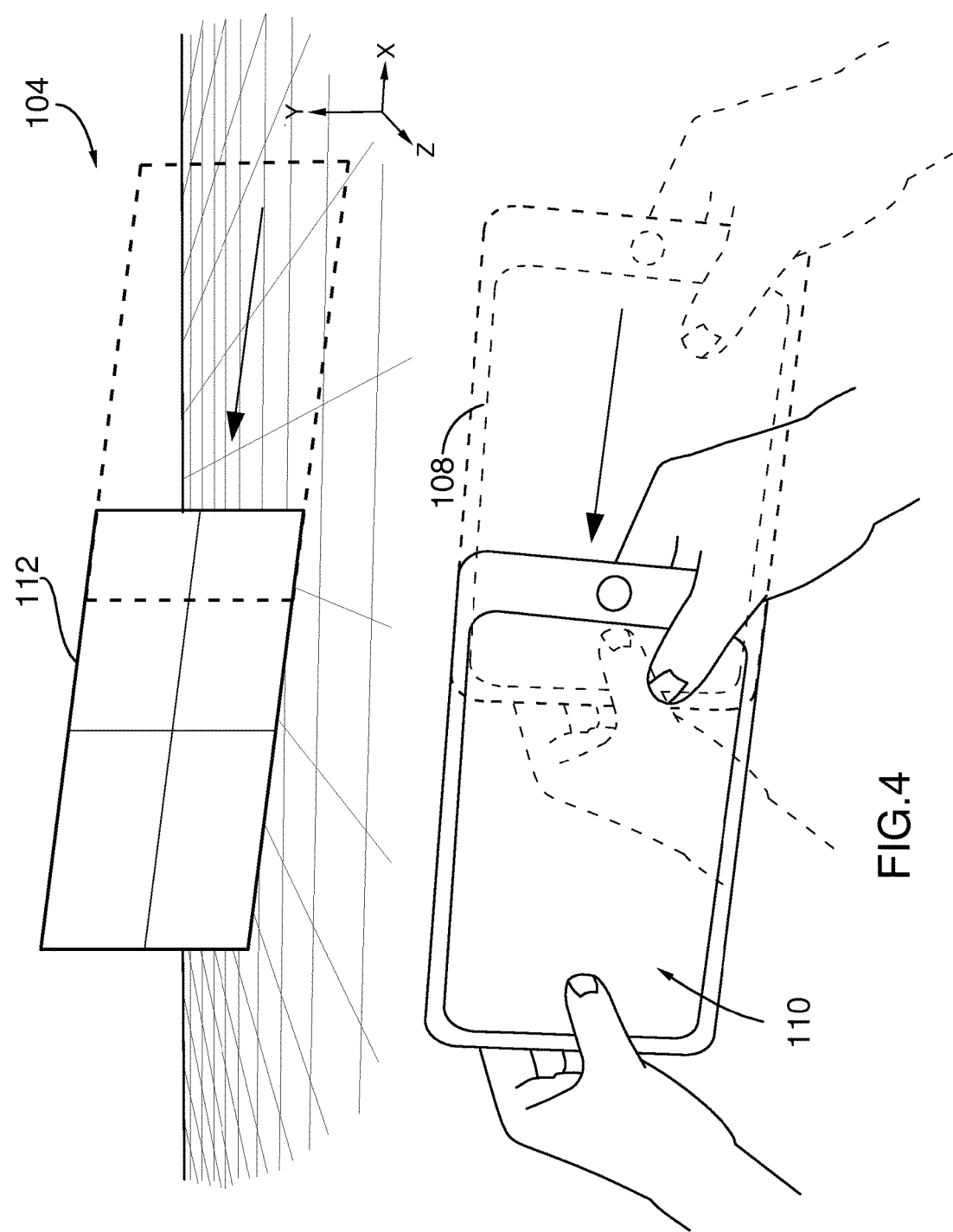
FIG. 4 is a schematic view of a portable input device and of a 3D virtual environment for the 3D virtual environment interaction system shown in FIG. 1, showing movement of the planar reference frame in a planar movement mode.

In one embodiment illustrated in FIG. 4, the plurality of frame movement modes could include a planar movement mode, in which movement of the planar reference frame 112 is restricted to translation in a direction tangential (i.e. coplanar) relative to the planar reference frame 112. In this mode, the planar reference frame 112 will not move in a direction normal to the planar reference frame 112, even if the portable input device 108 is moved in a direction normal to the planar input surface 110. Furthermore, this mode allows the planar reference frame 112 to move in rotation only about a rotation axis extending in a normal direction relative to the planar reference frame 112.

In one embodiment illustrated in FIG. 5, the at least one frame movement mode could include a normal movement mode in which movement of the planar reference frame 112 is restricted to translation along a linear movement path extending in a direction normal to the planar reference frame 112. In this mode, the planar reference frame 112 will not move in a tangential or coplanar direction relative to the planar reference frame 112, even if the portable input device 108 is moved in a direction tangent to the planar input surface 110. Furthermore, this mode also does not allow the planar reference frame 112 to move in rotation, and therefore does not allow the orientation of the planar reference frame 112 to be modified.

In one embodiment illustrated in FIG. 6, the at least one frame movement mode comprises a hinged movement mode in which movement of the planar reference frame 112 is restricted to rotation about a rotation axis R extending tangentially relative to the planar reference frame 112. Specifically, the rotation axis R could be defined at the center of the planar reference frame 112, as shown in FIG. 6. Alternatively, the rotation axis R could instead be located at an edge of the planar reference frame 112 to allow rotation of the planar reference frame 112 about its edge.

In the embodiment illustrated in FIG. 6, the rotation axis R further extends vertically. Alternatively, the rotation axis R could instead extend horizontally. In another embodiment, the rotation axis R could instead extend in any orientation selected by the user. In yet another embodiment, the rotation axis R could extend in one of a vertical and horizontal direction depending on a direction of a rotation axis about which the user rotates the portable input device when in the hinged movement mode. If the user rotates the portable input device around a vertical axis, then the rotation axis R of the planar reference frame 112 also extends vertically. If the user rotates the portable input device 108 around a horizontal rotation axis, then the rotation axis R of the planar reference frame 112 becomes horizontal as well.

In one embodiment, rotation of the portable input device 108 directly corresponds to the rotation of the planar reference frame 112. For example, a rotation of the portable input device 108 of 90 degrees clockwise about a vertical rotation axis will cause a rotation of the planar reference frame 112 of 90 degrees clockwise about a vertical rotation axis.

In one embodiment, the at least one frame movement mode comprises an angle snapping mode in which the planar reference frame 112 is allowed to be rotated freely until the orientation of the planar reference frame 112 is near certain predetermined angles. Specifically, when in the angle snapping mode, the planar reference frame 112 is adapted to move to one of the plurality of predetermined orientations when the orientation of the planar reference frame 112 is within a predetermined angular range from said one of the plurality of predetermined orientations. This predetermined angular range could for example comprise a 5-degree range. Therefore, when the portable input device 108 is rotated such that the orientation of the planar reference frame 112 comes within 5 degrees of a predetermined orientation, the planar reference frame 112 will immediately rotate (i.e. snap) to this predetermined orientation.

The planar input surface 110 could further be adapted to receive at least one touch gesture, specifically in an embodiment in which the planar input surface 110 is a touchscreen. In this embodiment, the processing unit 102 is adapted to modify at least one of the position and orientation of the planar reference frame 112 in response to said at least one touch gesture. For example, the at least one touch gesture may comprise sliding a finger in a generally straight line on the planar input surface 110 to move the planar reference frame 112 tangentially relative to the planar reference frame 112. In another example, the planar reference frame 112 could be moved in the normal movement mode wherein sliding a finger in a generally straight line on the planar input surface 110 move the planar reference frame 112 in a normal direction relative to the planar reference frame 112 by a distance proportional to the distance travelled by the finger on the planar input surface 110.

It will be appreciated that the touch gesture could comprise a multi-touch gesture (i.e. a touch gesture performed with more than one finger).

Other touch gestures could also be used to perform other functions relative to the planar reference frame 112. In one embodiment, multi-touch gestures could further be used for increase and reducing the size of the planar reference frame 112. Specifically, a pinch gesture, using two fingers, could be used for this purpose. The user would bring the two fingers closer together to reduce the size of the planar reference frame 112 and would move them further apart to increase the size of the planar reference frame 112. It will be appreciated that a variety of other touch gestures could be used.

It will also be appreciated that the combination of movement of the planar reference frame 112 according to the position and orientation of the planar input surface 110 and according to at least one touch gesture could provide the user with better control over the positon and orientation of the planar reference frame 112 within the 3D virtual environment.

Now turning to FIG. 7, the system 100 further allows the user perform various types of user interactions with the 3D virtual environment by using the planar reference frame 112. In one embodiment, the user interaction comprises inserting a two-dimensional drawing 700 on the planar reference frame 112. Specifically, the planar input surface 112 could be adapted to allow the user to draw the two-dimensional drawing 700 directly thereon. The two-dimensional drawing 700 would thereby be received by the portable input device 108 and transmitted to the processing unit, which could then insert the two-dimensional drawing 700 on the planar reference frame 112. It will be understood that once the two-dimensional drawing 700 has been inserted in the 3D virtual environment on the planar reference frame 112, it may be fixed at this location such that further movement of the planar reference frame 112 will not move the two-dimensional drawing 700.

In an embodiment in which the planar input surface 110 comprises a touchscreen, and the two-dimensional drawing 700 could for example be simply drawn or sketched free-hand using a finger or a stylus on the touchscreen. In one embodiment, the portable input device 108 comprises an input program which includes one or more drawings tools. These drawings tools could be similar to the drawing tools found in a conventional two-dimensional computer-aided design (CAD) program and could include, for example, a line drawing tool to allow the user to conveniently draw straight lines and a two-dimensional shape drawing tool to allow the user to conveniently draw a plurality of predetermined two-dimensional shapes. It will be appreciated that the input program could further include any other drawing tool known to a skilled addressee, including both raster drawing tools and vector drawing tools.

It will be appreciated that the term "two-dimensional drawing" is used herein to refer to a drawing drawn on the planar input surface 110 and could also include a "one-dimensional drawing", i.e. a single point.

In one embodiment, the planar reference frame 112 may be temporarily fixed at a desired location within the 3D virtual environment. This would facilitate the drawing on the planar input surface 110 by the user, especially when the planar input surface is oriented at an inconvenient angle.

Figure 8:
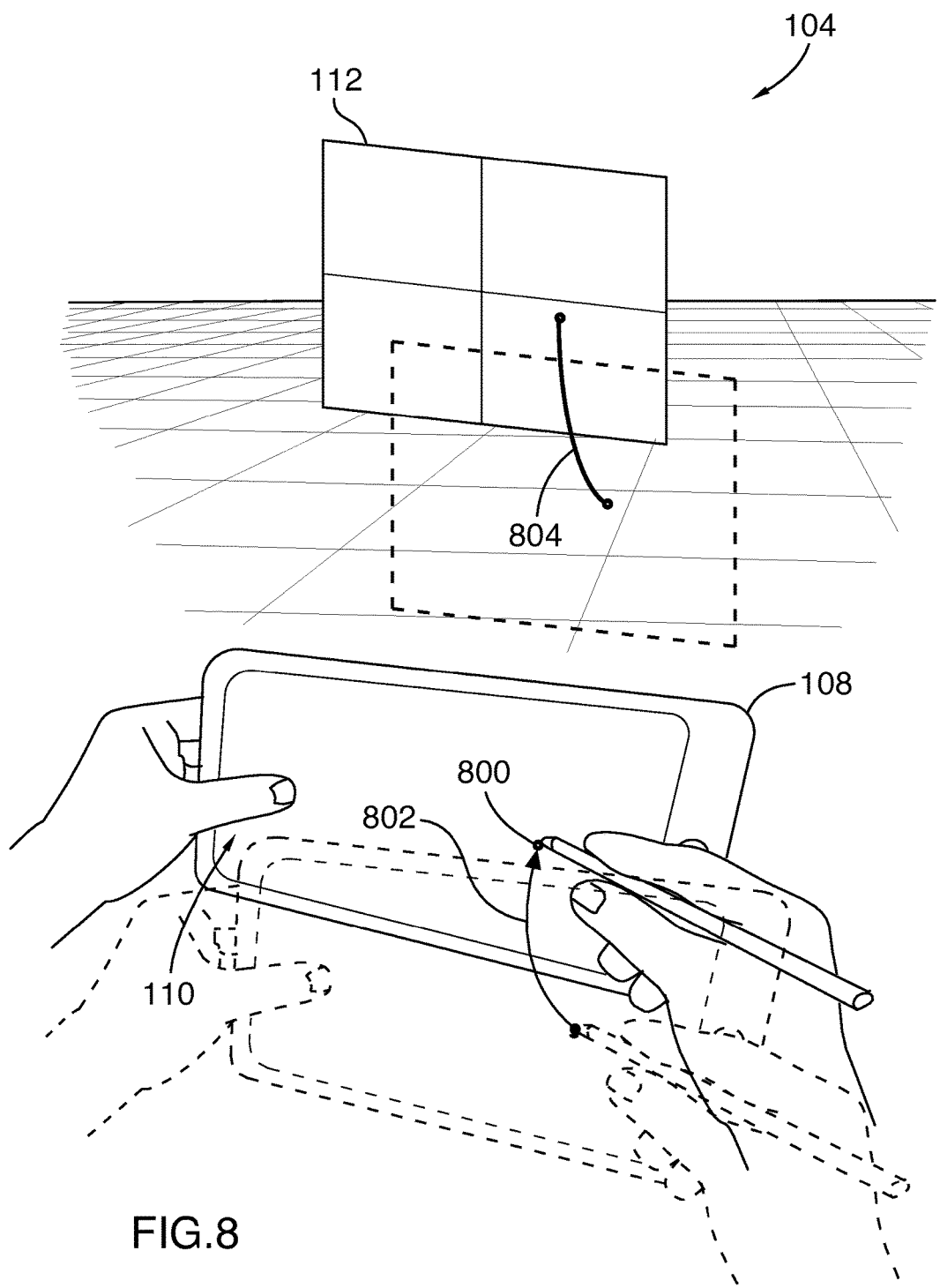
FIG. 8 is a schematic view of a portable input device and of a 3D virtual environment for the 3D virtual environment interaction system shown in FIG. 1, showing a three-dimensional drawing being drawn in the 3D virtual environment.

Now referring to FIG. 8, the system 100 further allows the user to draw a three-dimensional drawing within the 3D virtual environment 104. To achieve this, the user could start by drawing a two-dimensional drawing on the planar input surface 110. For example, the user could place a finger or a stylus on the planar input surface to create a point 800 on the planar reference frame. The two-dimensional drawing would then be inserted in the 3D virtual environment 104, at the current location of the planar reference frame.

The user could then move the planar reference frame away from the drawing plane along a drawing path 802. Since the finger or a stylus of the user is still in the planar input surface 110, a line 804 would be drawn along the drawing path, thereby forming a three-dimensional drawing.

In one embodiment, the two-dimensional drawing could instead comprise a two-dimensional shape and the movement of the two-dimensional shape could form an extrusion having a constant cross-section corresponding to the two-dimensional shape. Alternatively, the cross-section of the extrusion could be modified by the user as the two-dimensional shape is being extruded. For example, the user could make a pinch gesture on the planar input surface 110 as the portable input device 108 is moved. This would provide a relatively easy and efficient way to create extrusions in a 3D virtual environment.

It will be appreciated that the two-dimensional drawing is not limited to a single point or a single shape. The two-dimensional drawing could comprise multiple points or shapes, which would respectively create multiple lines similar to line 804 or multiple extrusions when the planar reference frame 112 is moved in the 3D virtual environment.

Figure 9A:
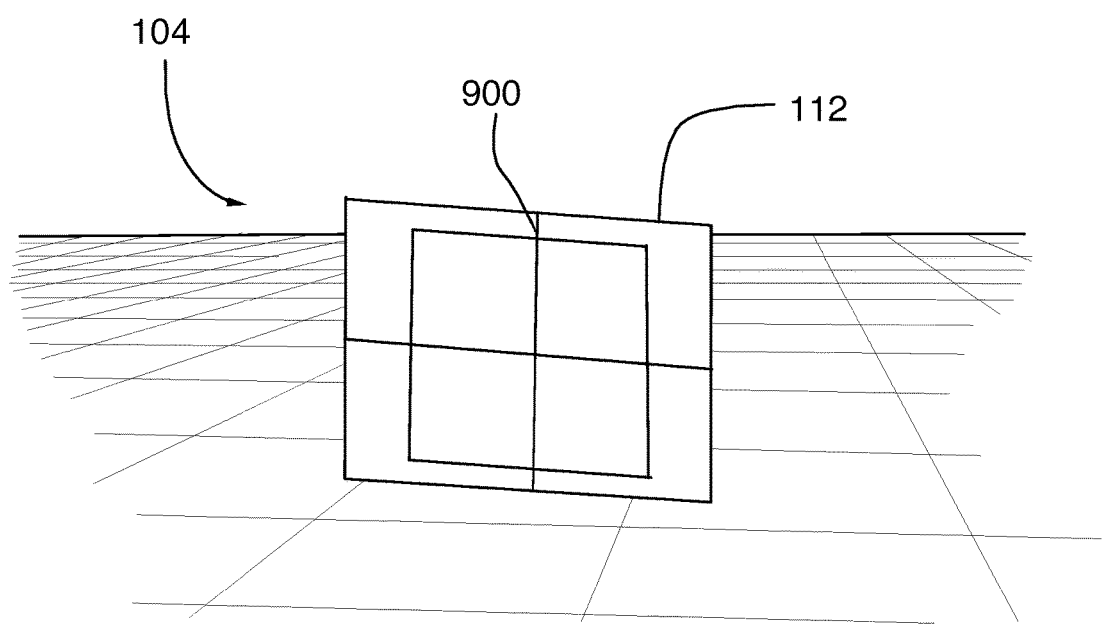
FIG. 9A is a schematic view of a 3D virtual environment for the 3D virtual environment interaction system shown in FIG. 1, showing a first two-dimensional rectangular shape being drawn in the 3D virtual environment in a first plane.
Figure 9B:
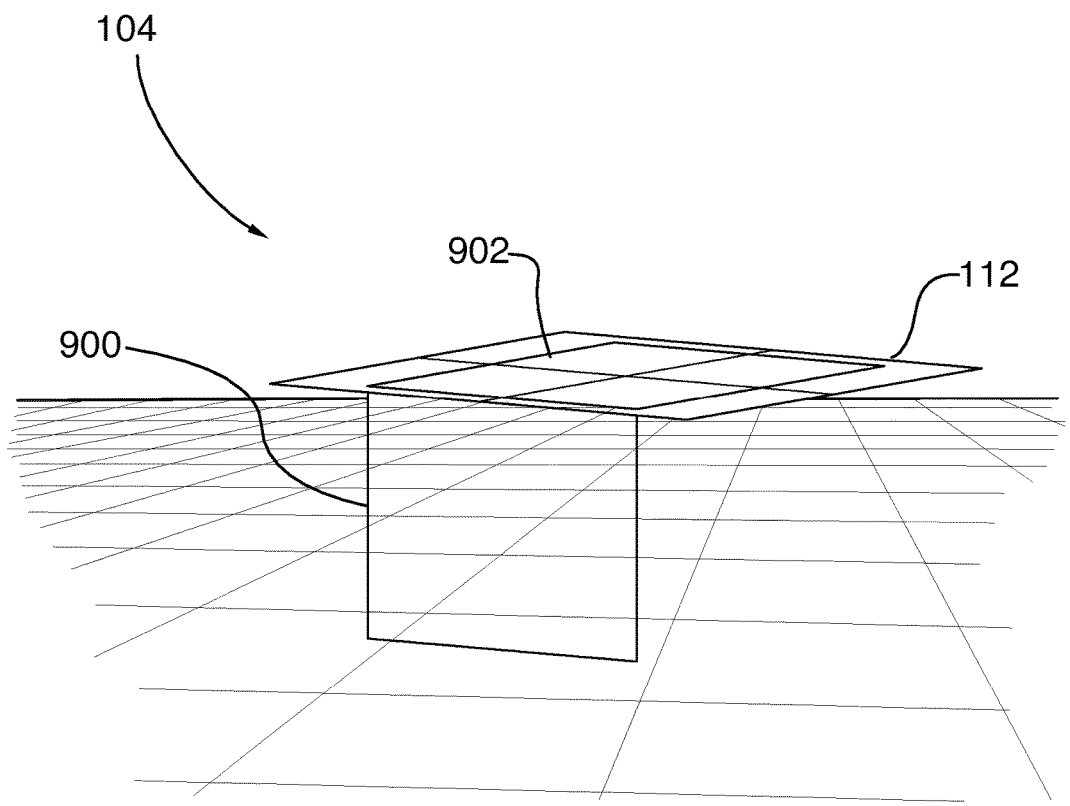
FIG. 9B is a schematic view of a 3D virtual environment for the 3D virtual environment interaction system shown in FIG. 1, showing a second two-dimensional rectangular shape being drawn in the 3D virtual environment in a second plane.
Figure 9C:
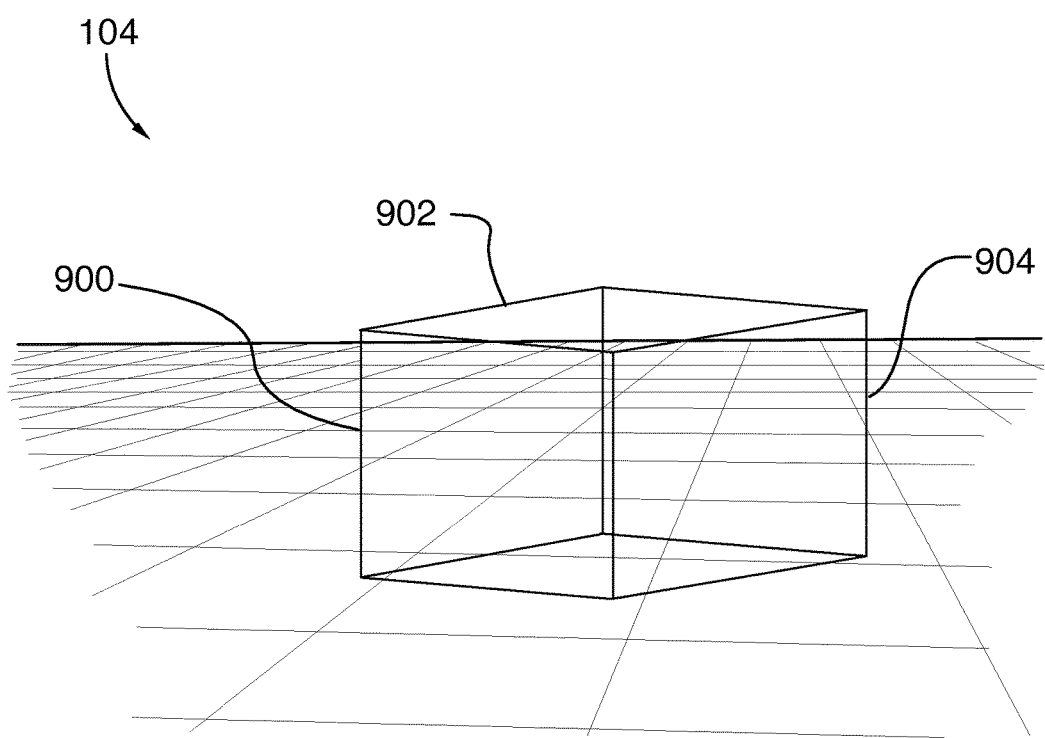
FIG. 9C is a schematic view of a 3D virtual environment for the 3D virtual environment interaction system shown in FIG. 1, showing a three-dimensional rectangular prism comprising the first and second two-dimensional rectangular shapes drawn in the 3D virtual environment.

Now referring to FIGS. 9A to 9C, it will also be appreciated that three-dimensional drawings could also be created by successively moving the planar reference frame 112 and drawing multiple two-dimensional drawings at different orientations within the 3D virtual environment 104.

In one embodiment, the planar reference frame 112 is first oriented in a vertical orientation and a first two-dimensional rectangular shape 900 is drawn by the user in the 3D virtual environment, as shown in FIG. 9A. The planar reference frame 112 is then rotated, for example using the hinged movement mode as described above, to a horizontal orientation and moved in translation to allow the user to draw in the 3D virtual environment 104 a second two-dimensional rectangular shape 902 which is orthogonal and adjacent to the first two-dimensional rectangular shape 900, as shown in FIG. 9B. By successively moving the planar reference frame 112 to appropriate locations and orientations, the user can thereby draw a three-dimensional rectangular prism 904 within the 3D virtual environment 104, the three-dimensional rectangular prism 904 comprising a plurality of two-dimensional rectangular shapes 900, 902 drawn in different planes.

It will be appreciated the rectangular prism described above is merely provided as an example, and that the user could draw numerous different three-dimensional drawings using this technique.

Figure 10:
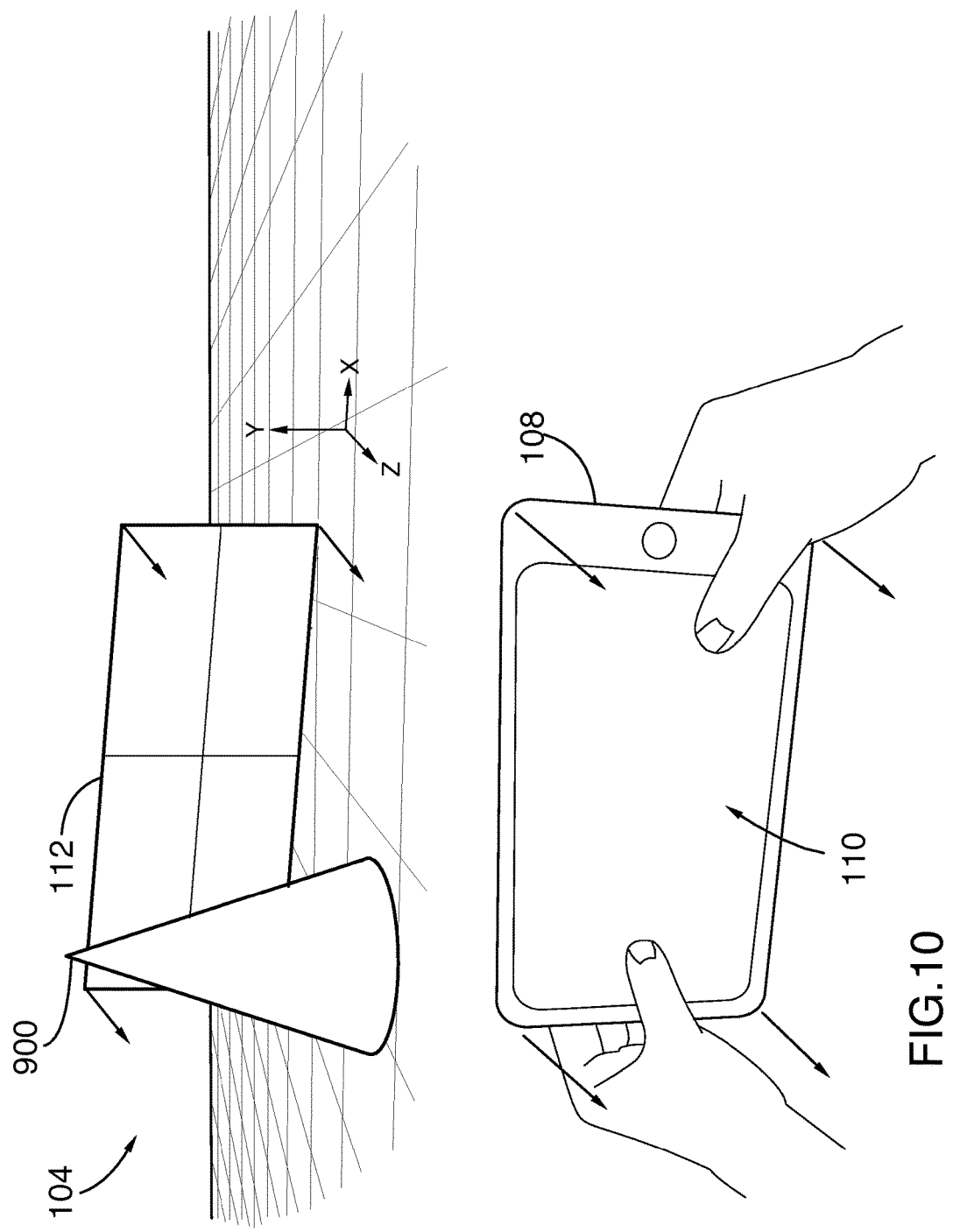
FIG. 10 is a schematic view of a portable input device and of a 3D virtual environment for the 3D virtual environment interaction system shown in FIG. 1, showing the planar reference frame being moved towards a virtual object.
Figure 11:
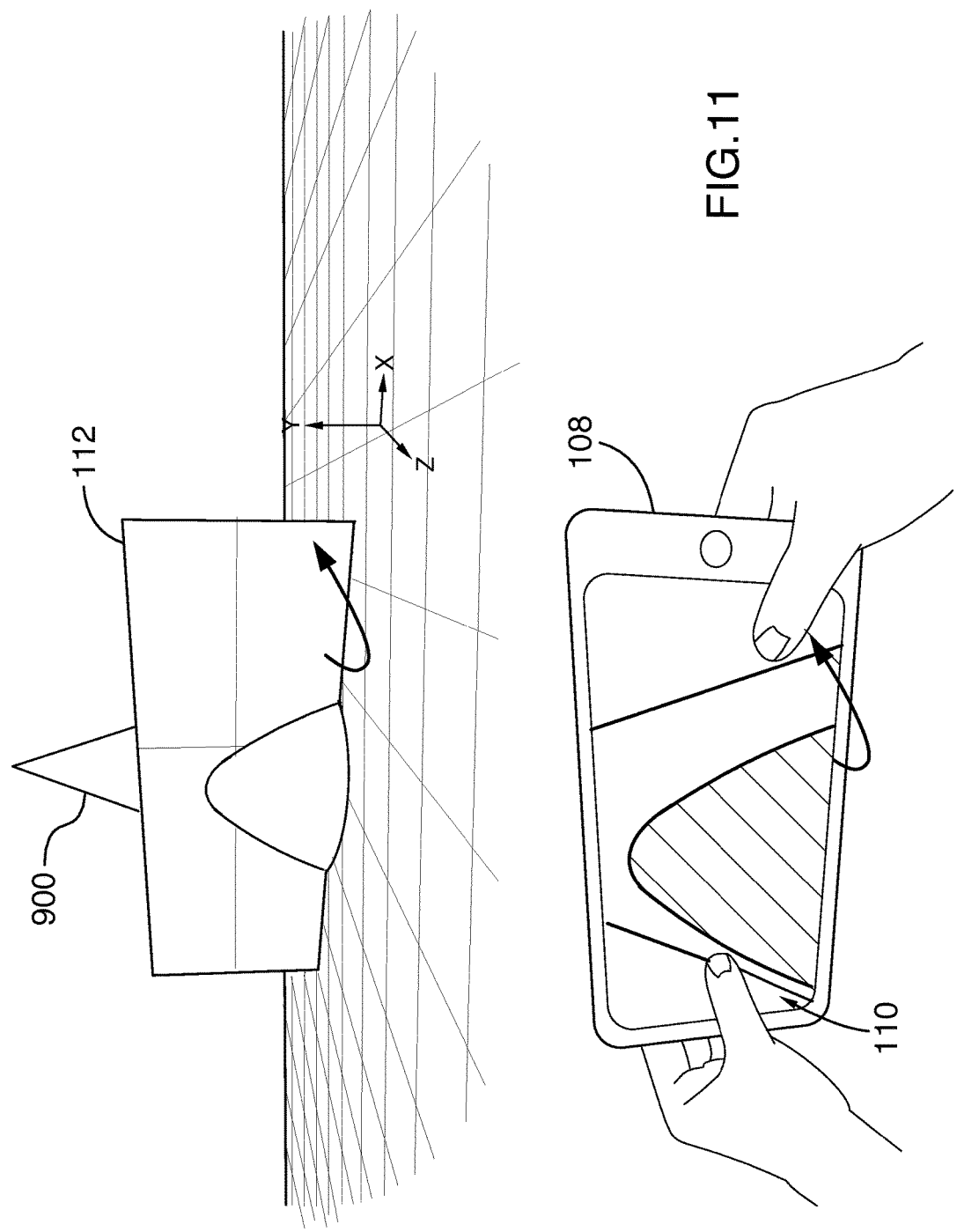
FIG. 11 is a schematic view of a portable input device and of a 3D virtual environment for the 3D virtual environment interaction system shown in FIG. 1, showing the planar reference frame intersecting the virtual object.
Figure 12:
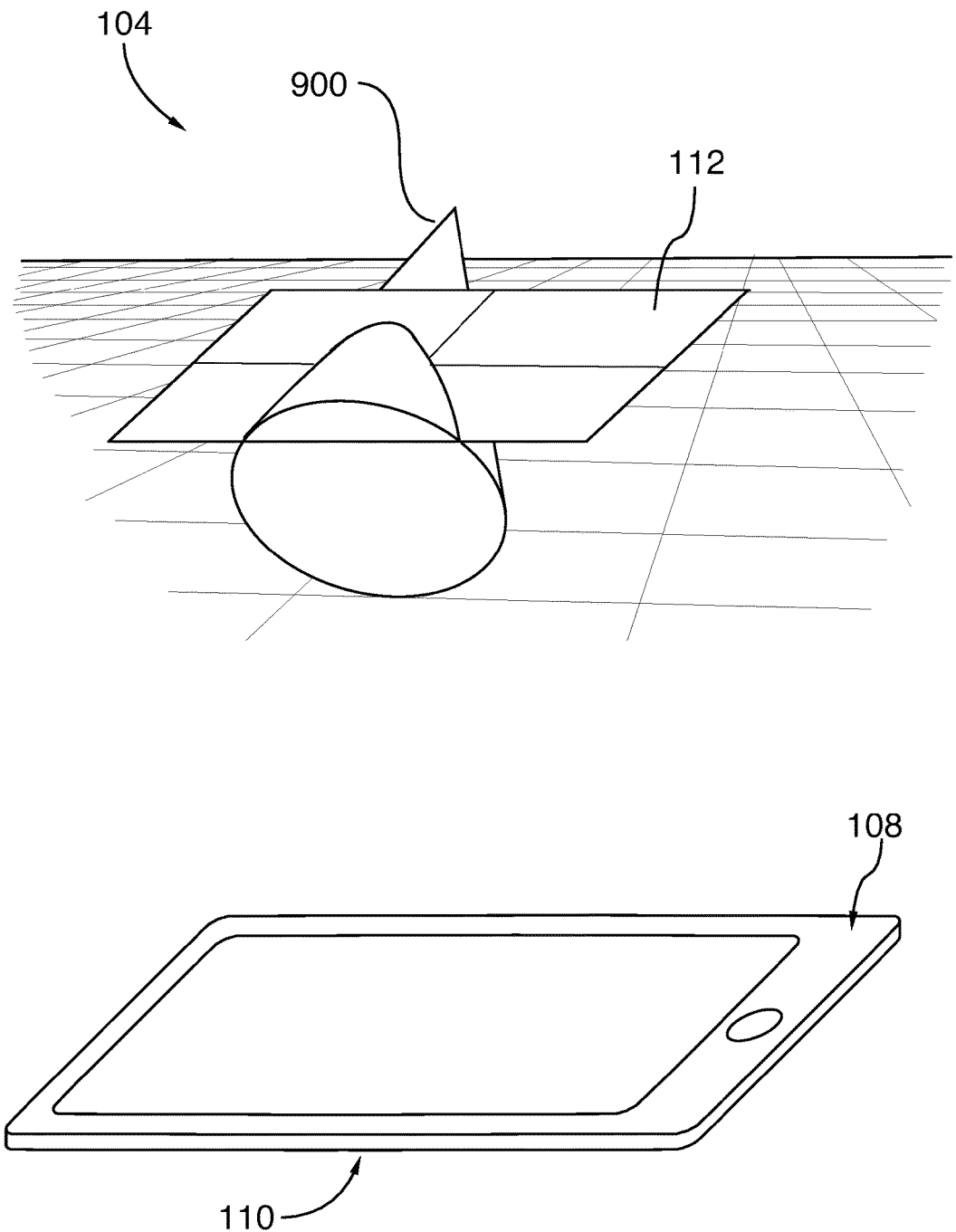
FIG. 12 is a schematic view of a portable input device and of a 3D virtual environment for the 3D virtual environment interaction system shown in FIG. 1, showing the planar reference frame intersecting the virtual object and the virtual object moved in rotation and translation.

Now referring to FIGS. 10 to 12, apart from drawing in the 3D virtual environment 104, the user interaction could also comprise selecting a virtual object 1000 on the 3D virtual environment 104. Specifically, the 3D virtual environment 104 could comprise one or more discrete virtual objects which could be manipulated within the 3D virtual environment 104.

In one embodiment, selecting the virtual object 1000 comprises positioning the planar reference frame 112 such that the planar reference frame 112 intersects the virtual object 1000, as shown in FIG. 11. Once the planar reference frame 112 intersects the virtual object 1000, the user can select the virtual object 1000 via the portable input device 108. One or more virtual objects could also be selected by activating a selection mode and moving the planar reference frame 112 in the 3D virtual environment 104. In this mode, every virtual object which is intersected by the moving planar reference frame 112 is selected.

Selected virtual objects can then be manipulated by the user. In one embodiment, the user can scale the selected virtual object. Specifically, once the virtual object is selected, the user could use a multi-touch gesture, such as a pinching gesture, to increase or decrease the size of the virtual object. For example, the size of the selected virtual object could decrease when the user brings his two fingers making the pinching gesture closer together and could increase when the two fingers are moved apart. This scaling could be isotropic (i.e. all the proportions of the selected virtual object would be maintained) or anisotropic (i.e. the scaling is non-uniform and the selected virtual object is stretched).

In one embodiment, the selected virtual object can also be moved within the 3D virtual environment, as shown in FIG. 12. The movement can include translation of the selected virtual object and/or rotation of the selected virtual object 1000.

In one embodiment, the selected virtual object 1000 can also be duplicated. Specifically, the system 100 could be provided with a copy-and-paste function to allow one or more copies of the selected virtual object to be created in the 3D virtual environment 104.

In one embodiment, an existing virtual object can also be imported into the 3D virtual environment 104. In this embodiment, the imported virtual object could be positioned and oriented within the 3D virtual environment 104 according to the position and orientation of the planar reference frame 112. To import an existing virtual object, the user would therefore position and orient the planar reference frame 112 according to a desired position and orientation of the imported virtual object in the 3D virtual environment 104, and then import the virtual object in the 3D virtual environment. Alternatively, the user may import the virtual object in the 3D virtual environment 104 first, and then position and orient the imported virtual object in the 3D virtual environment as desired.

In one embodiment, a pre-existing two-dimensional drawing can also be imported and directly inserted in the 3D virtual environment on the planar reference 112. The pre-existing two-dimensional drawing could be a vector drawing, a bitmap image, an animation or even a digital video which would be could be played in the 3D virtual environment.

In one embodiment, the portable input device 108 further comprises a secondary display for displaying the 3D virtual environment 104. In an embodiment in which the planar input surface comprises a touchscreen, the touchscreen could further define the secondary display, for example. This secondary display could be used to provide additional visual information about the 3D virtual environment 104 to the user.

In one embodiment, the secondary display is adapted to display an orthogonal projection of the 3D virtual environment 104 as projected on the planar reference frame 112, as illustrated in FIG. 13. It will be appreciated that this could provide visual cues to assist the user in drawing on the planar input surface 110.

In an embodiment in which the planar reference frame 112 may be moved in the hinged movement mode, the orthogonal projection displayed on the secondary display may be inverted (i.e. flipped by 180 degrees) when the planar reference frame 112 is rotated about a horizontal axis beyond a horizontal orientation. This would prevent the secondary display from displaying an upside-down orthogonal projection of the 3D virtual environment.

Alternatively, considering that the display unit 106 is adapted to display the 3D virtual environment 104 in a perspective view from a main point of view, the secondary display could be adapted to display the 3D virtual environment 104 in a perspective view from a secondary point of view which is different from the main point of view. This configuration could allow the user to simultaneously observe different elements of the 3D virtual environment 104 at once, or to observe the same elements of the 3D virtual environment 104, but from different angles.

In one embodiment, the planar reference frame 112 could define a cross-section plane, such that the secondary display shows a cross-section of a virtual object when the planar reference frame intersects said virtual object, as best shown in FIG. 11.

Alternatively, the plurality of viewing modes could include any other viewing mode known to a skilled addressee.

In one embodiment, the processing unit 102 is further adapted for allowing the user to modify at least one of the position and orientation of the main point of view.

For example, the position of the main point of view may be moved by sliding a finger on the planar input surface 110. If the planar input surface 110 is horizontal, this will simply move the main point of view horizontally within the 3D virtual environment. If the planar input surface is oriented at an angle relative to the horizontal when the finger is sliding on the planar input surface, the main point of view will be raised or lowered as it moves laterally. In this case, the rate of elevation will depend on the orientation of the planar input surface relative to the horizontal. The main point of view can also be rotated by using one or more fingers to make a rotation gesture on the planar input surface 110.

In one embodiment, the movement of the main point of view may be orbited around a desired point or a desired vertical axis in the 3D virtual environment. Specifically, using one or more fingers to make a rotation gesture on the planar input surface 110 would cause the point of view to move along an arcuate path having this desired point or vertical axis as its center, while remaining oriented towards (i.e. pointed at) the desired point or vertical axis. For example, the desired vertical axis could be defined by a central vertical axis of the planar reference frame 112. Alternatively, the central vertical axis could be selected by the user at any desired location within the 3D virtual environment.

In one embodiment, the main point of view may also be selectively tilted upwardly and downwardly. Specifically, the main point of view may be generally vertical (i.e. pointed at the horizon) during standard operation of the system 100. The main point of view could then be tilted selectively tilted upwardly and downwardly by activating a tilt mode, in which rotating the planar input surface 110 about a horizontal axis (i.e. tilting up the planar input surface 110) would rotate the main point of view upwardly or downwardly such that the main point of view is pointed at a location located above or below the horizon, respectively. In one embodiment, the main point of view could then be automatically returned to a generally vertical point of view when the tilt mode is deactivated.

In one embodiment, the main point of view could be moved and/or rotated in response to an input from the user and the movement and rotation of the main point of view could further continue in a decelerating fashion when the user ceases the input. For example, the input could comprise one of the touch gestures described above (sliding gesture and rotation gesture), and the movement of the main point of view could continue while the speed of the movement decreases at a certain deceleration rate after the touch gesture is release, until the movement ends. The deceleration rate could be determined, or could be computed based on the speed at which the main point of view was moving or rotating when the touch gesture was released. This may contribute in reducing the number of touch gestures required when the user wishes to move the main point of view along a relatively large distance within the 3D virtual environment.

In one embodiment, there is further provided one or more positioning assistance mechanisms adapted to provide visual cues to the user to facilitate the positioning of the planar reference frame 112 within the 3D virtual environment.

Specifically, when the planar reference frame 112 is moved or rotated, the main point of view could be automatically moved along a horizontal arcuate path while remaining oriented so as to point towards a desired point or vertical axis, for example a central vertical axis of the planar reference frame 112. Movement of the main point of view could comprise relatively slow and small oscillations which would provide a "parallax effect" to enhance the 3D effect of the 3D virtual environment 104 as displayed on the display unit 106.

In one embodiment, the planar reference frame 112 is transparent when idle and becomes semi-translucent when moved or rotated. When the planar reference frame 112 in a semi-translucent state is located between the main point of view and a virtual object, the virtual objects will appear in a darker shade than it normally would. This provides an indication to the user of the location in the 3D virtual environment 104 of the planar reference frame 112 relative to the virtual object.

In one embodiment, the portable input device 108 further comprises various additional functions, such as control of the lighting position and orientation within the 3D virtual environment 104.

It will be appreciated that the system 100 described hereinabove may greatly simplify interactions within the 3D virtual environment 104, as compared to a conventional interaction system. For example, in a single gesture, the user could move a virtual object along a three-dimensional path within the 3D virtual environment 104 and also rotate and/or scale the object in the 3D virtual environment. A similar operation in a conventional 3D design program using a cursor and a mouse would require multiple steps, including switching between a virtual rotation tool and a virtual translation tool, as well as multiple point of view changes.

In one embodiment, the processing unit 102 comprises a main program which generates the 3D virtual environment 104 and the portable input device 108 comprises a secondary program which is operatively connected to the main program and which receives input from the user and transmit the received inputs to the main program. Alternatively, the processing unit could be provided within the portable input device 108, and the portable input device 108 could comprises a single program which both generates the 3D virtual environment 104 and receives inputs from the user. It will be understood that this embodiment is possible as long as the portable input device 108 has sufficient computing power to generate a desired 3D virtual environment.

It will also be appreciated that the system 100 is particularly well adapted to be used for collaborative interactions within the 3D virtual environment. In one embodiment, the system 100 comprises one or more additional portable input devices operatively connected to the processing unit 104, each one being associated with a corresponding additional planar reference frame provided in the 3D virtual environment 104. Alternatively, a plurality of processing units could be connected over a network such as an IP-based network, each processing unit allowing access to a common 3D virtual environment.

The embodiments of the invention described above are intended to be exemplary only. The scope of the invention is therefore intended to be limited solely by the scope of the appended claims.

We claim:

1. A 3D virtual environment interaction system comprising:
   a processor that generates a 3D virtual environment,
   the 3D virtual environment comprising a planar reference frame for allowing a user to perform a user interaction with the 3D virtual environment,
   the user interaction including selecting a virtual object in the 3D virtual environment by positioning the planar reference frame within the 3D virtual environment such that the planar reference frame intersects the virtual object;
   a display unit operatively connected to the processor for displaying the generated 3D virtual environment including the planar reference frame within the 3D virtual environment;
   a single portable input device that allows the user to control the position and orientation of the planar reference frame within the generated 3D virtual environment, the portable input device comprising a planar input surface;
   a position and orientation sensor for monitoring the position and orientation of the planar input surface in a real-world space, the position and orientation sensor being operatively connected to the processor to allow the processor to modify at least one of the position and the orientation of the planar reference frame in response to a change in a corresponding one of the position and orientation of the planar input surface.

2. The system as claimed in claim 1, wherein the user interaction comprises inserting a two-dimensional drawing on the planar reference frame.

3. The system as claimed in claim 2, wherein the planar input surface is adapted to allow the user to draw the two-dimensional drawing thereon.

4. The system as claimed in claim 3, wherein the portable input device comprises at least one virtual drawing tool selected from a group consisting of: a line drawing tool and a two-dimensional shape drawing tool.

5. The system as claimed in claim 3, wherein the processor is adapted to produce a three-dimensional drawing when the portable device is moved in the real-world space in a direction normal to the planar input surface, thereby moving the planar reference frame with the inserted two-dimensional drawing.

6. The system as claimed in claim 1, wherein the user interaction further comprises scaling the selected virtual object.

7. The system as claimed in claim 6, wherein the scaling comprises isotropic scaling.

8. The system as claimed in claim 6, wherein the scaling comprises anisotropic scaling.

9. The system as claimed in claim 1, wherein the user interaction further comprises moving the selected object.

10. The system as claimed in claim 9, wherein moving the selected object comprises at least one of moving the selected object in translation and rotating the selected object.

11. The system as claimed in claim 1, wherein the user interaction further comprises duplicating the selected object.

12. The system as claimed in claim 1, wherein the user interaction comprises importing an existing virtual object into the 3D virtual environment, and positioning and orienting said existing virtual object within the 3D virtual environment according to the position and orientation of the planar reference frame.

13. The system as claimed in claim 1, wherein the processor is adapted to move the planar reference frame according to a selected one of at least one frame movement mode in response to a movement of the planar input surface.

14. The system as claimed in claim 13, wherein the at least one frame movement mode comprises a free movement mode in which the planar reference frame is moved such that the position and orientation of the planar reference frame within the 3D virtual environment corresponds to the position and orientation of the planar input surface in the real-world space.

15. The system as claimed in claim 13, wherein the at least one frame movement mode comprises a planar movement mode in which movement of the planar reference frame is restricted to translation in a tangential direction relative to the planar reference frame.

16. The system as claimed in claim 13, wherein the at least one frame movement mode comprises a normal movement mode in which movement of the planar reference frame is restricted to translation in a normal direction relative to the planar reference frame.

17. The system as claimed in claim 13, wherein the at least one frame movement mode comprises a hinged movement mode in which movement of the planar reference frame is restricted to rotation about a rotation axis extending tangentially relative to the planar reference frame.

18. The system as claimed in claim 13, wherein the at least one frame movement mode comprises an angle snapping mode in which the planar reference frame is adapted to move to one of a plurality of predetermined orientations when the orientation of the planar reference frame is within a predetermined angular range from said one of the plurality of predetermined orientations.

19. The system as claimed in claim 18, wherein the predetermined angular range comprises a 5-degree range.

20. The system as claimed in claim 1, wherein the planar input surface is further adapted to receive at least one touch gesture and wherein the processor is adapted to modify at least one of the position and orientation of the planar reference frame in response to said at least one touch gesture.

21. The system as claimed in claim 20, wherein the at least one touch gesture comprises a multi-touch gesture.

22. The system as claimed in claim 1, wherein the portable input device further comprises a secondary display for displaying the 3D virtual environment.

23. The system as claimed in claim 22, wherein the secondary display is adapted to display an orthogonal projection of the 3D virtual environment as projected on the planar reference frame.

24. The system as claimed in claim 22, wherein the display unit is adapted to display the 3D virtual environment in a perspective view from a main point of view and the secondary display is adapted to display the 3D virtual environment in a perspective view from a secondary point of view which is different from the main point of view.

25. The system as claimed in claim 1, wherein the planar input surface comprises a touchscreen, the touchscreen further defining the secondary display.

26. The system as claimed in claim 1, wherein the display unit is adapted to display the 3D virtual environment from a main point of view, and further wherein the processor is adapted for allowing the user to modify at least one of the position and orientation of the main point of view.

27. The system as claimed in claim 26, wherein the position of the main point of view is movable by sliding a finger on the planar input surface.

28. The system as claimed in claim 27, wherein the planar input surface is adapted to receive a rotation gesture, the processor being adapted to change the orientation of the main point of view according to said rotation gesture.

29. The system as claimed in claim 1, wherein the portable input device comprises a tablet computer having a touchscreen which defines the planar input surface.

30. The system as claimed in claim 1, wherein the sensor comprises a magnetic sensor including a receiver and an emitter, one of the receiver and the emitter being attached to the portable input device and the other one of the receiver and the emitter being positioned at a static position within the real-world space.

* * * * *